(12) United States Patent
Noh et al.

(10) Patent No.: US 11,683,768 B2
(45) Date of Patent: *Jun. 20, 2023

(54) METHOD AND APPARATUS FOR TIME AND FREQUENCY TRACKING IN CELLULAR COMMUNICATION SYSTEM

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Donghan Kim, Gyeonggi-do (KR); Taehyoung Kim, Seoul (KR); Cheolkyu Shin, Gyeonggi-do (KR); Seunghoon Choi, Gyeonggi-do (KR); Younsun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 18 days.

This patent is subject to a terminal disclaimer.

(21) Appl. No.: 17/385,235

(22) Filed: Jul. 26, 2021

(65) Prior Publication Data

US 2021/0352603 A1    Nov. 11, 2021

Related U.S. Application Data

(63) Continuation of application No. 16/476,492, filed as application No. PCT/KR2018/000022 on Jan. 2, 2018, now Pat. No. 11,076,371.

(30) Foreign Application Priority Data

Jan. 6, 2017   (KR) .................. 10-2017-0002594
Mar. 16, 2017  (KR) .................. 10-2017-0033352
Apr. 28, 2017  (KR) .................. 10-2017-0055405

(51) Int. Cl.
H04W 56/00    (2009.01)
H04L 1/00     (2006.01)
H04L 5/00     (2006.01)

(52) U.S. Cl.
CPC .......... H04W 56/001 (2013.01); H04L 1/0026 (2013.01); H04L 5/0007 (2013.01); H04L 5/0051 (2013.01)

(58) Field of Classification Search
CPC .. H04W 56/001; H04L 1/0026; H04L 5/0007; H04L 5/0051; H04L 27/26; H04J 11/0079
See application file for complete search history.

(56) References Cited

U.S. PATENT DOCUMENTS 9,419,759 B2    8/2016  Choi et al.
2013/0114535 A1*  5/2013  Ng .................. H04L 5/0051
                                              370/329

(Continued)

FOREIGN PATENT DOCUMENTS

KR   1020140099238   8/2014
KR   1020150073993   7/2015

(Continued)

OTHER PUBLICATIONS

Korean Office Action dated Aug. 19, 2021 issued in counterpart application No. 10-201790055405, 9 pages.

(Continued)

*Primary Examiner* — Habte Mered
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to (Continued)

intelligent services based on the 5G communication technology and the IoT-related technology, such as smart home, smart building, smart city, smart car, connected car, health care, digital education, smart retail, security and safety services. The present invention provides a method and an apparatus which can achieve accurate time and frequency synchronization while reducing system load, in line with the design requirements for a 5G communication system. Particularly, the present invention provides a method for acquiring time and frequency synchronization by a terminal in a communication system, the method comprising the steps of: receiving a first synchronization signal from a base station; receiving a second synchronization signal from the base station; and receiving a channel state information-reference signal (CSI-RS) from the base station, and acquiring downlink time and frequency synchronization with the base station on the basis of the CSI-RS.

16 Claims, 31 Drawing Sheets

(56) References Cited

U.S. PATENT DOCUMENTS

| | | |
|---|---|---|
| 2015/0030037 A1 | 1/2015 | Ahn et al. |
| 2015/0092768 A1 | 4/2015 | Ng |
| 2015/0237602 A1* | 8/2015 | Chae .................. H04J 11/00 370/329 |
| 2016/0029333 A1 | 1/2016 | Seo et al. |
| 2016/0262029 A1 | 9/2016 | Zhao et al. |
| 2017/0048917 A1 | 2/2017 | Kim |
| 2017/0070312 A1 | 3/2017 | Yi et al. |
| 2017/0332368 A1 | 11/2017 | Einhaus |
| 2018/0102817 A1 | 4/2018 | Park |
| 2019/0052443 A1 | 2/2019 | Cheng |
| 2019/0132172 A1 | 5/2019 | Saito |
| 2019/0313353 A1 | 10/2019 | Koorapaty |

FOREIGN PATENT DOCUMENTS

| | | |
|---|---|---|
| KR | 1020150123679 | 11/2015 |
| KR | 1020160005003 | 1/2016 |
| KR | 1020160081946 | 7/2016 |
| KR | 1020160128401 | 11/2016 |

OTHER PUBLICATIONS

PCT/ISA/210 Search Report issued on PCT/KR2018/000022, pp. 5.
PCT/ISA/237 Written Opinion issued on PCT/KR2017/000022, pp. 4.
European Search Report dated Dec. 18, 2019 issued in counterpart application No. 18735828.8-1220, 7 pages.
Korean Office Action dated Feb. 15, 2022 issued in counterpart application No. 10-2017-0055405, 4 pages.

* cited by examiner

FIG. 3B
 : 310
 : 320
[TABLE 5]
| SCS | 15 | 30 | 60 | 120 | 240 | [kHz] |
|-----|-----|-----|-----|-----|-----|-------|
| EPA | 162.6 | 81.3 | 40.7 | 20.3 | 10.2 | [REs] |
| EVA | 26.6 | 13.3 | 6.6 | 3.3 | 1.7 | [REs] |
| ETU | 13.3 | 6.7 | 3.3 | 1.7 | 0.8 | [REs] |
$D_f$ ACCORDING TO SCS IN LTE CHANNEL MODEL

[TABLE 6]

| SCS | 15 | 30 | 60 | 120 | 240 | [kHz] |
|---|---|---|---|---|---|---|
| CF 2GHz | 6.0 | 3.0 | 1.5 | 0.7 | 0.4 | [REs] |
| CF 6GHz | 6.0 | 3.0 | 1.5 | 0.8 | 0.4 | [REs] |
| CF 28GHz | 8.2 | 4.1 | 2.1 | 1.0 | 0.5 | [REs] |
| CF 60GHz | 9.6 | 4.8 | 2.4 | 1.2 | 0.6 | [REs] |

$D_f$ ACCORDING TO SCS AND CF IN TDL-A CHANNEL MODEL [UMa]

[TABLE 7]

| SCS | 15 | 30 | 60 | 120 | 240 | [kHz] |
|---|---|---|---|---|---|---|
| CF 2GHz | 24.6 | 12.3 | 6.1 | 3.1 | 1.5 | [REs] |
| CF 6GHz | 22.5 | 11.2 | 5.6 | 2.8 | 1.4 | [REs] |
| CF 28GHz | 22.7 | 11.3 | 5.7 | 2.8 | 1.4 | [REs] |
| CF 60GHz | 22.8 | 11.4 | 5.7 | 2.8 | 1.4 | [REs] |

$D_f$ ACCORDING TO SCS AND CF IN TDL-A CHANNEL MODEL [UMi]

[TABLE 8]

| SCS | 15 | 30 | 60 | 120 | 240 | [kHz] |
|---|---|---|---|---|---|---|
| CF 2GHz | 3.0 | 1.5 | 0.7 | 0.4 | 0.2 | [REs] |
| CF 6GHz | 3.0 | 1.5 | 0.7 | 0.4 | 0.2 | [REs] |
| CF 28GHz | 4.1 | 2.0 | 1.0 | 0.5 | 0.3 | [REs] |
| CF 60GHz | 4.8 | 2.4 | 1.2 | 0.6 | 0.3 | [REs] |

$D_f$ ACCORDING TO SCS AND CF IN TDL-E CHANNEL MODEL [UMa]

[TABLE 9]

| SCS | 15 | 30 | 60 | 120 | 240 | [kHz] |
|---|---|---|---|---|---|---|
| CF 2GHz | 12.2 | 6.1 | 3.0 | 1.5 | 0.8 | [REs] |
| CF 6GHz | 11.1 | 5.6 | 2.8 | 1.4 | 0.7 | [REs] |
| CF 28GHz | 11.2 | 5.6 | 2.8 | 1.4 | 0.7 | [REs] |
| CF 60GHz | 11.3 | 5.6 | 2.8 | 1.4 | 0.7 | [REs] |

$D_f$ ACCORDING TO SCS AND CF IN TDL-E CHANNEL MODEL [UMa]

[TABLE 11]

| SCS | 15 | 30 | 60 | 120 | 240 | [kHz] |
|---|---|---|---|---|---|---|
| 30 km/h | 126.1 | 252.3 | 504.5 | 1009.1 | 2018.1 | [REs] |
| 60 km/h | 63.1 | 126.1 | 252.3 | 504.5 | 1009.1 | [REs] |
| 120 km/h | 31.5 | 63.1 | 126.1 | 252.3 | 504.5 | [REs] |
| 350 km/h | 10.8 | 21.6 | 43.2 | 86.5 | 173.0 | [REs] |
| 500 km/h | 7.6 | 15.1 | 30.3 | 60.5 | 121.1 | [REs] |

$D_t$ ACCORDING TO SCS AND SPEED OF UE

[TABLE 12]

| SCS | 15 | 30 | 60 | 120 | 240 | [kHz] |
|---|---|---|---|---|---|---|
| 30 km/h | 42.0 | 84.1 | 168.2 | 336.4 | 672.7 | [REs] |
| 60 km/h | 21.0 | 42.0 | 84.1 | 168.2 | 336.4 | [REs] |
| 120 km/h | 10.5 | 21.0 | 42.0 | 84.1 | 168.2 | [REs] |
| 350 km/h | 3.6 | 7.2 | 14.4 | 28.8 | 57.7 | [REs] |
| 500 km/h | 2.5 | 5.0 | 10.1 | 20.2 | 40.4 | [REs] |

$D_t$ ACCORDING TO SCS AND SPEED OF UE

[TABLE 13]

| SCS | 15 | 30 | 60 | 120 | 240 | [kHz] |
|---|---|---|---|---|---|---|
| 30 km/h | 9.0 | 18.0 | 36.0 | 72.1 | 144.2 | [REs] |
| 60 km/h | 4.5 | 9.0 | 18.0 | 36.0 | 72.1 | [REs] |
| 120 km/h | 2.3 | 4.5 | 9.0 | 18.0 | 36.0 | [REs] |
| 350 km/h | 0.8 | 1.5 | 3.1 | 6.2 | 12.4 | [REs] |
| 500 km/h | 0.5 | 1.1 | 2.2 | 4.3 | 8.6 | [REs] |

$D_t$ ACCORDING TO SCS AND SPEED OF UE

[TABLE 14]

| SCS | 15 | 30 | 60 | 120 | 240 | [kHz] |
|---|---|---|---|---|---|---|
| 30 km/h | 4.2 | 8.4 | 16.8 | 33.6 | 67.3 | [REs] |
| 60 km/h | 2.1 | 4.2 | 8.4 | 16.8 | 33.6 | [REs] |
| 120 km/h | 1.1 | 2.1 | 4.2 | 8.4 | 16.8 | [REs] |
| 350 km/h | 0.4 | 0.7 | 1.4 | 2.9 | 5.8 | [REs] |
| 500 km/h | 0.3 | 0.5 | 1.0 | 2.0 | 4.0 | [REs] |

$D_t$ ACCORDING TO SCS AND SPEED OF UE

METHOD AND APPARATUS FOR TIME AND FREQUENCY TRACKING IN CELLULAR COMMUNICATION SYSTEM

PRIORITY

This application is a Continuation of U.S. patent application Ser. No. 16/476,492, filed in the U.S. Patent and Trademark Office on Jul. 8, 2019, which is a National Phase Entry of PCT International Application No. PCT/KR2018/000022 which was filed on Jan. 2, 2018, and claims priority to Korean Patent Application Nos. 10-2017-0002594, 10-2017-0033352 and 10-2017-0055405, which were filed on Jan. 6, 2017, Mar. 16, 2017 and Apr. 28, 2017, respectively, the content of each of which is incorporated herein by reference.

TECHNICAL FIELD

The disclosure relates to a wireless communication system and, more particularly, to a method and an apparatus in which a base station estimates time and frequency synchronization for a base station transmission signal to decode a reception signal of a terminal within a cell in next generation mobile communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In a $5^{th}$ generation wireless cellular communication system (hereinafter, referred to as 5G communication system or 5G system), a high-order quadrature amplitude modulation (hereinafter, referred to as QAM) is used to modulate a signal to support high resolution image services. Meanwhile, the QAM can be demodulated through coherent demodulation, and a terminal needs to synchronize a transmission signal with time and frequency in order to receive the demodulated QAM. A third or fourth generation wireless cellular communication system supported a terminal to synchronize a transmission signal with time and frequency through always-on signals such as a first synchronization signal and a second synchronization signal (PSS and SSS), a cell-specific reference signal (CRS), a channel state information reference signal (CSI-RS), and the like. However, the always-on signals are main causes of an increase in the system load, so they tend to be minimized in the 5G communication system.

DISCLOSURE OF INVENTION

Technical Problem

Meanwhile, in order to demodulate a high-order QAM signal of a 5G communication system, there is a need to support high-accuracy time and frequency synchronization compared to a pre-4G communication system. Thus, there is a need for a method and apparatus which can achieve accurate time and frequency synchronization while reducing system load in line with the design requirements for a 5G communication system.

Solution to Problem

In accordance with an aspect of the disclosure, there is provided a method for acquiring time and frequency synchronization by a terminal in a communication system, the method including: receiving a first synchronization signal from a base station; receiving a second synchronization signal from the base station; and receiving a channel state information-reference signal (CSI-RS) from the base station; and acquiring downlink time and frequency synchronization with the base station on the basis of the CSI-RS. In addition, the CSI-RS may have one antenna port. Resource elements (REs) to which the CSI-RS is mapped may be separated by four subcarrier intervals on a frequency axis and separated by four OFDM symbol intervals on a time axis. The CSI-RS may be located in fifth and ninth OFDM symbols of a slot.

In accordance with another aspect of the disclosure, there is provided a method for transmitting a CSI-RS by a base station in a communication system, the method including: transmitting a first synchronization signal to a terminal; transmitting a second synchronization signal to the terminal; and transmitting the CSI-RS to the terminal, wherein the CSI-RS is used for the terminal to acquire downlink time and frequency synchronization with the base station.

In accordance with another aspect of the disclosure, there is provided a terminal for acquiring time and frequency synchronization in a communication system, the terminal including: a receiver; and a controller configured to control the receiver to receive a first synchronization signal from a base station, to receive a second synchronization signal from the base station, and to receive a CSI-RS from the base station, and the controller configured to acquire downlink time and frequency synchronization with the base station on the basis of the CSI-RS.

In accordance with another aspect of the disclosure, there is provided a base station for transmitting a CSI-RS in a communication system, the base station including: a transmitter; and a controller configured to control the transmitter to transmit a first synchronization signal to a terminal, to transmit a second synchronization signal to the terminal, and to transmit the CSI-RS to the terminal, wherein the CSI-RS is used for the terminal to acquire downlink time and frequency synchronization with the base station.

Advantageous Effects of Invention

According to an embodiment of the disclosure, a base station constituting a 5G communication system can transmit a synchronization signal or a reference signal for efficient time and frequency synchronization of a terminal, and the terminal can perform time and frequency synchronization on the basis of a synchronization signal or a reference signal transmitted by the base station, thereby efficiently demodulating a received signal.

BRIEF DESCRIPTION OF DRAWINGS

FIGS. 3B, 3C, 3D, 3E, 3F, 3G, 3H, 3I, and 3J are diagrams illustrating Tables 5 to 9 and Tables 11 to 14, respectively;

MODE FOR THE INVENTION

Figure 1:
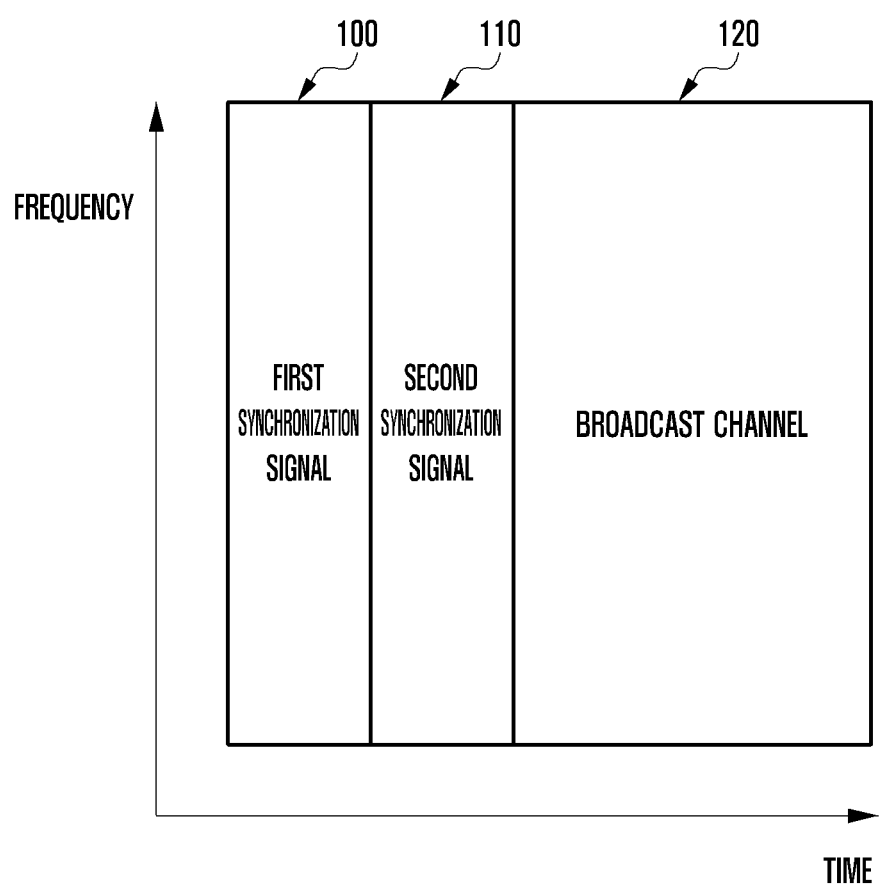
FIG. 1 is a diagram illustrating an example of a synchronization signal and a broadcast channel structure of a 5G communication system considered in the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In addition, in describing the embodiments of the disclosure, a main substance of the disclosure may be applied to even other communication systems that have a similar technical background with a little change in a range that is not largely out of the range of the disclosure, and this may be possible by a determination of a person having a skilled technical knowledge in a technical field of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims Throughout the specification, the same or like reference numerals designate the same or like elements Here, it will be understood that each block of the flowchart illustrations, and combinations of blocks in the flowchart illustrations, can be implemented by computer program instructions These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks And each block of the flowchart illustrations may represent a module, segment, or portion of code, which includes one or more executable instructions for implementing the specified logical function(s). It should also be noted that in some alternative implementations, the functions noted in the blocks may occur out of the order For example, two blocks shown in succession may in fact be executed substantially concurrently or the blocks may sometimes be executed in the reverse order, depending upon the functionality involved As used herein, the "unit" refers to a software element or a hardware element, such as a Field Programmable Gate Array (FPGA) or an Application Specific Integrated Circuit (ASIC), which performs a predetermined function However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Disclosed are a communication scheme and a system thereof for converging an IoT technology and a 5G communication system for supporting a high data transfer rate beyond that of a 4G system. The disclosure can be applied to intelligent services (for example, services related to a smart home, smart building, smart city, smart car, connected car, health care digital education, retail business, security, and safety) based on the 5G communication technology and the IoT-related technology The terms as used in the following description, such as terms indicating broadcast information, terms indicating control information, terms indicating communication coverage, terms indicating a state change (e.g., event), terms indicating network entities, terms indicating messages, and terms indicating device elements, are given by way of example for the convenience of description Accordingly, the disclosure is not limited to the following terms and other terms having the same technical meaning may be used For convenience of the description, the disclosure uses terms and names defined in the 3rd Generation Partnership Project Long Term Evolution (3GPP LTE) However, the disclosure is not limited by the above terms and names and may be correspondingly applied to systems complying with other standards Wireless communication systems providing voice-based services are being developed for use in broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of the institute of electrical and electronics engineers (IEEE).

As a representative example of the broadband wireless communication systems, an LTE system employs orthogonal frequency division multiplexing (OFDM) for a downlink (DL), and employs a single carrier (SC)-frequency division multiple access (FDMA) scheme for an uplink (UL). The UL refers to a wireless link for transmitting data or a control signal from a terminal (e.g., a user equipment (UE) or a mobile station (MS)) to a base station (BS) (or an evolved node B (eNB)), and the DL refers to a wireless link for transmitting data or a control signal from the BS to the terminal. The above-described multiple access schemes generally distinguish between data or control information of different users by allocating time-frequency resources for the data or control information of the users not to overlap each other, i.e., to establish orthogonality therebetween.

As a post-LTE system, a 5G communication system (can be mixed with new radio (NR)) needs to support services capable of freely reflecting various requirements of users, service providers, etc. Services considered for the 5G communication system include enhanced mobile broadband (eMBB), massive machine-type communication (mMTC), and ultra-reliability low-latency communication (URLLC) services.

The eMBB service is aimed to provide an enhanced data rate compared to a data rate supported by the existing LTE, LTE-A, or LTE-Pro. For example, the eMBB service in the 5G communication system needs to provide a peak data rate of 20 gigabits per second (Gbps) for a DL and provide a peak data rate of 10 Gbps for a UL in view of a single BS. At the same time, an increased user-perceived data rate of a terminal needs to be provided. To satisfy these requirements, enhanced transceiving technology including enhanced multiple-input and multiple-output (MIMO) is required. The eMBB service may satisfy the data rate required for the 5G communication system by using a frequency bandwidth wider than 20 MHz in a frequency band of 3 to 6 GHz or over 6 GHz instead of a 2 GHz band currently used for LTE.

At the same time, the mMTC service in the 5G communication system is considered to support application services such as an Internet of Things (IoT). The mMTC service is required to, for example, support massive terminal access within a cell, enhance terminal coverage, increase battery time, and reduce terminal charges, to efficiently provide the IoT service. The IoT service provides a communication function by using a variety of sensors attached to various devices, and thus needs to support a large number of terminals within a cell (e.g., 1,000,000 terminals/km$^2$). In addition, since terminals supporting mMTC are highly likely to be located in a shadow zone, e.g., a basement of a building, due to service characteristics, the mMTC service requires a wider coverage compared to other services provided by the 5G communication system. The terminals supporting mMTC need to be low-priced and are not able to have batteries of the terminal frequently replaced, and thus require very long battery life times.

Lastly, the URLLC service is a mission-critical cellular-based wireless communication service used for remote control of robots or machinery, industrial automation, unmanned aerial vehicles, remote healthcare, emergency alert, etc., and needs to provide ultra-low-latency and ultra-reliability communication. For example, the URLLC service needs to satisfy an air interface latency less than 0.5 milliseconds (ms) and, at the same time, requires a packet error rate equal to or less than $10^{-5}$. Therefore, for services supporting the URLLC, the 5G communication system needs to provide a smaller transmit time interval (TTI) compared to other services and, at the same time, is required to allocate wide resources in a frequency band.

The above-described services considered for the 5G communication system need to be integrated and provided on the basis of a single framework. That is, for efficient resource management and control, the services may not operate independently and may be integrally controlled and transmitted by a single system.

The base station, which is a device constituting the 5G communication system, and terminals managed by the base station must maintain synchronization closely in the DL and UL. Here, DL synchronization includes a process in which a terminal performs time and frequency synchronization with a base station using a synchronization signal transmitted by the base station and obtains cell information (e.g., a unique cell identity (Cell ID)) of the base station. In addition, UL synchronization includes a process of controlling the transmission timing of the terminal so that signals of terminals in a cell can arrive at a base station within a cyclic prefix period when the terminals transmit UL signals to the base station. In the disclosure, unless otherwise specified, synchronization means DL synchronization in which a terminal performs time and frequency synchronization with a base station signal and obtains cell information.

In the current 5G communication system, the following requirements are considered for DL synchronization of the terminal.

First, the DL synchronization required in the 5G communication system is aimed to provide a common framework regardless of the system in the 5G system providing various services. That is, regardless of various requirements of different services provided by the 5G communication system, synchronization signals and procedures must be provided so that the terminals can perform synchronization and system access according to a common synchronization signal structure and a common synchronization procedure.

The method and procedure for DL synchronization of the terminal in the 5G communication system are required to be designed to be the same regardless of a beam mode used by the base station to improve a data rate and coverage. In the 5G communication system, especially a millimeter wave-based communication system, beam-based transmission is particularly required according to various attenuation characteristics including high path loss attenuation. Synchronization signals also require beam-based transmission for the same reason.

The 5G communication system considers multi-beam and single-beam-based transmission and reception techniques to compensate for the above-described path loss. The multi-beam-based transmission is a method using a plurality of beams having a narrow beam width and a large beam gain and should cover a wide direction using a beam having a narrow beam width, so that signals must be transmitted through a plurality of beams formed in a plurality of directions. The single-beam-based transmission is a method using a single beam having a wide beam width but a small beam gain, and insufficient coverage resulting from the small beam gain can be secured using repetitive transmission or the like. A DL synchronization signal also requires beam-based transmission as in the data transmission, and aims to provide the same access procedure regardless of the above-described beam in the 5G communication system. That is, even without information on a beam operation method used for synchronization signal transmission in an initial access process, the terminal must be able to perform time and frequency synchronization and cell searching with the base station on the basis of the synchronization signal.

In addition, the method and procedure for synchronization of the terminal in the 5G communication system are required to be designed regardless of a duplex mode operated by a base station. In LTE, a different synchronization signal transmission method is used according to a time division duplex (TDD) and a frequency division duplex (FDD). Specifically, the index of an OFDM symbol through which a primary synchronization signal (PSS) and a secondary synchronization signal (SSS) constituting a synchronization signal are transmitted is designed differently depending on whether the base station uses TDD or FDD. Therefore, the terminal can determine the duplex mode of the base station using a time difference indicated by the OFDM symbol between the PSS and the SSS. However, when the location of the synchronization signal is changed according to the duplex, the terminal in the synchronization process is required to detect the changed location. That is, there is a problem that the complexity of the terminal is increased and the power consumption is increased during the synchronization process. Therefore, in the 5G communication system, the same synchronization signal transmission and procedure are required regardless of the duplex mode.

In addition, the method and procedure for synchronization of the terminal in the 5G communication system are required to be designed to be the same regardless of numerology provided by the base station. The 5G communication system may provide a plurality of numerologies to efficiently provide services that require various requirements. Here, the numerology includes a subcarrier spacing (hereinafter, referred to as SCS) and a cyclic prefix (hereinafter, referred to as CP) length which are required for signal generation in OFDM-based modulation and demodulation. Accordingly, it is desirable that the terminal and the base station follow the same DL synchronization method and procedure irrespective of various SCSs and CP lengths provided in the 5G communication system.

In addition, the method and procedure for synchronization of the terminal in the 5G communication system are required to be designed in the same manner regardless of whether a frequency band operated by the base station operates in a standalone mode or a non-standalone mode. At the same time, the method and procedure for synchronization of the terminal in the 5G communication system are required to be designed in the same manner regardless of whether the frequency band in which the base station operates the 5G communication system is a license band or a license-exempt band.

Also, in a downlink method and apparatus of the terminal provided in the 5G communication system, the synchronization method and procedure should be designed such that the terminal can perform time and frequency synchronization with the base station to communicate with the base station and perform cell searching in the same manner as in LTE. The base station must transmit a synchronization signal including cell information for synchronization and cell searching of the terminal, and the terminal can perform time and frequency synchronization and obtain cell information by detecting the synchronization signal.

In order to achieve the above purpose, in the 5G communication system, the use of two synchronization signals and a physical broadcast channel is also considered in a similar manner to LTE. The synchronization signal transmitted by the base station can be divided into a first synchronization signal and a second synchronization signal so that the terminal performs initial synchronization and cell searching in the 5G communication system. The first synchronization signal may be referred to as a primary synchronization signal. The first synchronization signal may be transmitted for the purpose of enabling the terminal to perform synchronization with respect to the time and frequency on which at least the base station is based. In addition, the first synchronization signal may include a portion of the cell information. Here, the cell information refers to a unique cell number assigned to the base station controlling the cell. Such a first synchronization signal may be used as a reference signal for coherent detection of the second synchronization signal.

The second synchronization signal may be referred to as a secondary synchronization signal. The second synchronization signal may be used for detection of the cell information. If a portion of the cell information is included in the first synchronization signal, the remaining cell information may be transmitted by the second synchronization signal. If the cell information is not included in the first synchronization signal, the terminal can acquire the cell information using only the second synchronization signal. The second synchronization signal may be used as a reference signal for coherent demodulation in receiving a broadcast channel transmitted by the base station after the terminal detects the cell number.

The terminal can perform time and frequency synchronization with the base station and perform cell searching using the first and second synchronization signals described above. Thereafter, the terminal can extract important information necessary for system access using the broadcast channel transmitted by the base station. Here, the broadcast channel may be referred to as a physical broadcast channel (PBCH) as in LTE. In the LTE, the PBCH for the same purpose is transmitted from the base station, and the PBCH provided by the LTE includes the following information.

System frequency size
Physical HARQ Indicator Channel (PHICH) reception information
System frame number
Number of antenna ports Information transmitted by the PBCH is minimum information for obtaining system information necessary for the terminal to access the base station. Information to be transmitted to the PBCH in the 5G communication system may be different from information to be transmitted in an LTE PBCH. For example, the LTE PBCH includes information necessary for the terminal to receive a PHICH. However, since the 5G system operates an asynchronous HARQ for an UL HARQ, the PBCH does not need information for PHICH reception because the PHICH is not needed.

In the disclosure, the first synchronization signal, the second synchronization signal, and the broadcast channel may be referred to as a single synchronization signal block (SS block). However, in the disclosure, the SS block to be considered is not limited to including the above-mentioned first synchronization signal, second synchronization signal, and broadcast channel. If the SS block is information necessary for time and frequency synchronization and cell searching of the terminal, additional signals and physical channels can be included in the SS block.

FIG. 1 is a diagram illustrating an example of a synchronization signal and a broadcast channel structure of a 5G communication system considered in the disclosure.

In FIG. 1, the synchronization signal of the 5G communication system according to the disclosure includes a first synchronization signal 100, a second synchronization signal 110, and a broadcast channel 120. In FIG. 1, the first synchronization signal 100, the second synchronization signal 110, and the broadcast channel 120 constitute a time division multiplexing structure in which they are transmitted at the same position in a frequency domain and are transmitted at different times. The first synchronization signal 100 may be composed of at least one OFDM symbol. Although it is assumed that the first synchronization signal 100 according to the disclosure is composed of one OFDM symbol, the disclosure is not limited to the number of OFDM symbols used for the first synchronization signal 100. The first synchronization signal 100 may be configured using a Zadoff-Chu sequence (ZC sequence) sequence having excellent cross correlation characteristics in a similar manner to LTE.

The second synchronization signal 110 may be also composed of at least one OFDM symbol, in a similar manner to the first synchronization signal 100. The disclosure is proposed assuming that the second synchronization signal 110 is composed of two OFDM symbols according to the disclosure, but the disclosure is not limited to the number of OFDM symbols used for the second synchronization signal 110.

Although the second synchronization signal 110 considered in the conventional LTE is generated using a pseudo noise (PN) sequence or a maximum-length sequence (M-sequence), the second synchronization signal 110 according to the disclosure does not exclude a case of using a sequence other than the PN sequence. For example, a synchronization signal may be configured using a Zadoff-Chu sequence, or a message that has been subjected to forward error correction coding after a cyclic redundancy check (CRC) is added to cell information may be used in transmission of the second synchronization signal 110.

The broadcast channel 120 may include a plurality of OFDM symbols in consideration of the size of information to be transmitted and the coverage of the cell.

In the disclosure, it is assumed that the first synchronization signal 100, the second synchronization signal 110, and the broadcast channel 120 are transmitted with the same frequency width. The exact frequency width may vary depending on the sequence constituting the synchronization signal and a method of mapping the sequence to a subcarrier constituting OFDM.

As shown in FIG. 1, when the first synchronization signal 100, the second synchronization signal 110, and the broadcast channel 120 have a time division multiplexing (TDM)

structure, the base station can maximize the coverage of the synchronization signal as needed. Since the first synchronization signal 100, the second synchronization signal 110, and the broadcast channel 120 are transmitted at the same frequency position, coherent demodulation of the broadcast channel 120 can be performed using the second synchronization signal. Therefore, the signal structure shown in FIG. 1 can be considered for the transmission of the synchronization signal of the 5G system.

Figure 2:
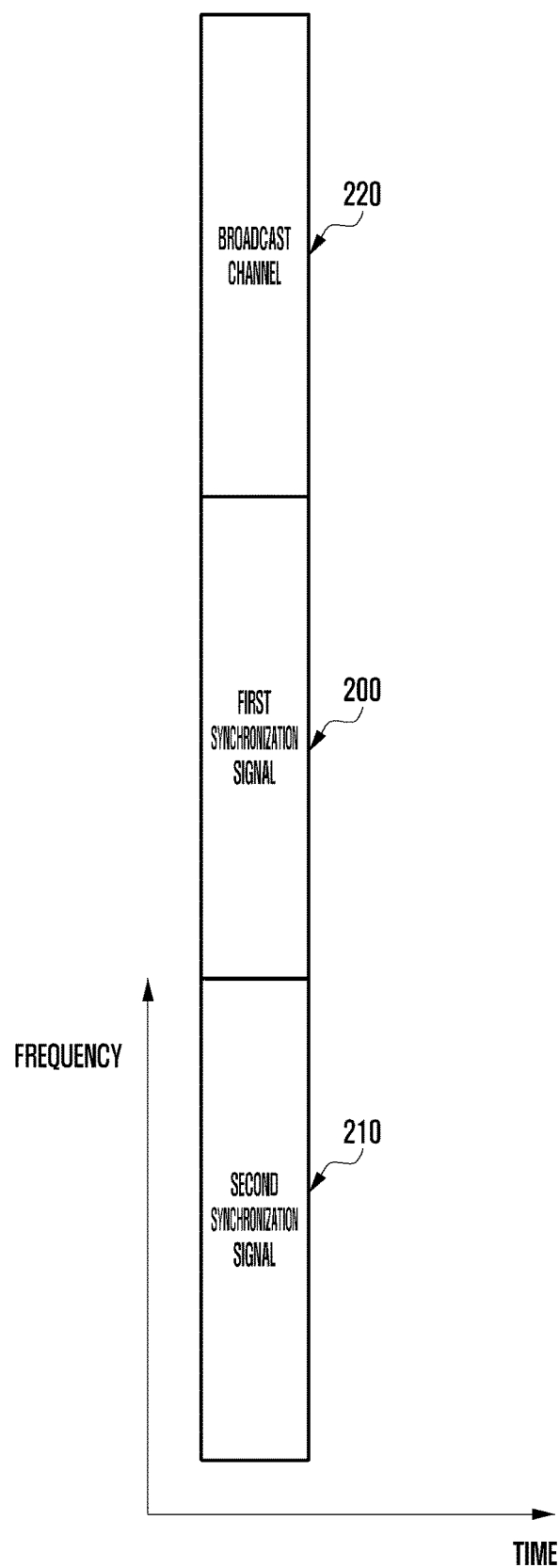
FIG. 2 is a diagram illustrating another example of a synchronization signal and a broadcast channel structure of a 5G communication system considered in the disclosure.

FIG. 2 is a diagram illustrating another example of a synchronization signal and a broadcast channel structure of a 5G communication system considered in the disclosure.

The synchronization signal of the 5G communication system according to the disclosure of FIG. 2 includes a first synchronization signal 200, a second synchronization signal 210, and a broadcast channel 220. In FIG. 2, the first synchronization signal 200, the second synchronization signal 210, and the broadcast channel 220 are located in the same time resource and have a frequency division multiplexing (FDM) structure in which they are transmitted at different frequency resources. The first synchronization signal 200, the second synchronization signal 210, and the broadcast channel 220 may be transmitted in the same OFDM symbol. Although it is proposed that the first synchronization signal 200, the second synchronization signal 210, and the broadcast channel 220 according to the disclosure are transmitted at the same OFDM symbol, the disclosure is not limited to the number of OFDM symbols used for the synchronization symbol and broadcast channel transmission.

The first synchronization signal 200 may be configured using a Zadoff-Chu sequence having cross correlation characteristics in a similar manner to LTE. Although the second synchronization signal 210 considered in the conventional LTE is generated using a PN sequence or a maximum length sequence (M-sequence), the second synchronization signal 210 according to the disclosure may use a sequence other than the PN-sequence. For example, the synchronization signal may be configured using the Zadoff-Chu sequence, or a message that has been subjected to forward error correction coding after a CRC is added to cell information may be used in transmission of the second synchronization signal 210.

In the disclosure, it is assumed that the first synchronization signal and the second synchronization signal are transmitted with the same frequency width. The exact frequency width may vary depending on the sequence constituting the synchronization signal and a method of mapping the sequence to a subcarrier of the synchronization signal.

As shown in FIG. 2, when the first synchronization signal 200, the second synchronization signal 210, and the broadcast channel 220 have a frequency division multiplexing (FDM) structure, there is a disadvantage that the coverage that the synchronization signal can provide can be reduced. Since the first synchronization signal 200, the second synchronization signal 210, and the broadcast channel 220 are transmitted at different frequency positions, coherent demodulation of the broadcast channel 120 cannot be performed using the second synchronization signal 210.

However, as described above, when multiple beam-based synchronous transmission is performed, the first synchronization signal 200, the second synchronization signal 210, and the broadcast channel 220 shown in FIG. 2 should be repeatedly transmitted in various directions in order to transmit the synchronous signal in an omni-directional manner in which the base station serves using a beam having a narrow beam width. Since multi-beam-based synchronization signal and broadcast channel transmission are performed using a fixed beam pattern, it is difficult for the base station to transmit data to a specific terminal using a different beam at the same OFDM symbol while transmitting the synchronization signal and the broadcast channel to a specific beam. Accordingly, the remaining frequency resources that do not transmit the synchronization signal and the broadcast channel in the OFDM symbol should be used only for the purpose of transmitting a separate common cell common signal or not be used for data transmission. Therefore, in order to transmit the multi-beam-based synchronization signal and broadcast channel, a structure in which the synchronization signal and the broadcast channel are frequency division multiplexed as shown in FIG. 2 is advantageous in that time and frequency resources are less wasted than a structure in which the SS block is time division multiplexed as shown in FIG. 1.

Figure 3A:
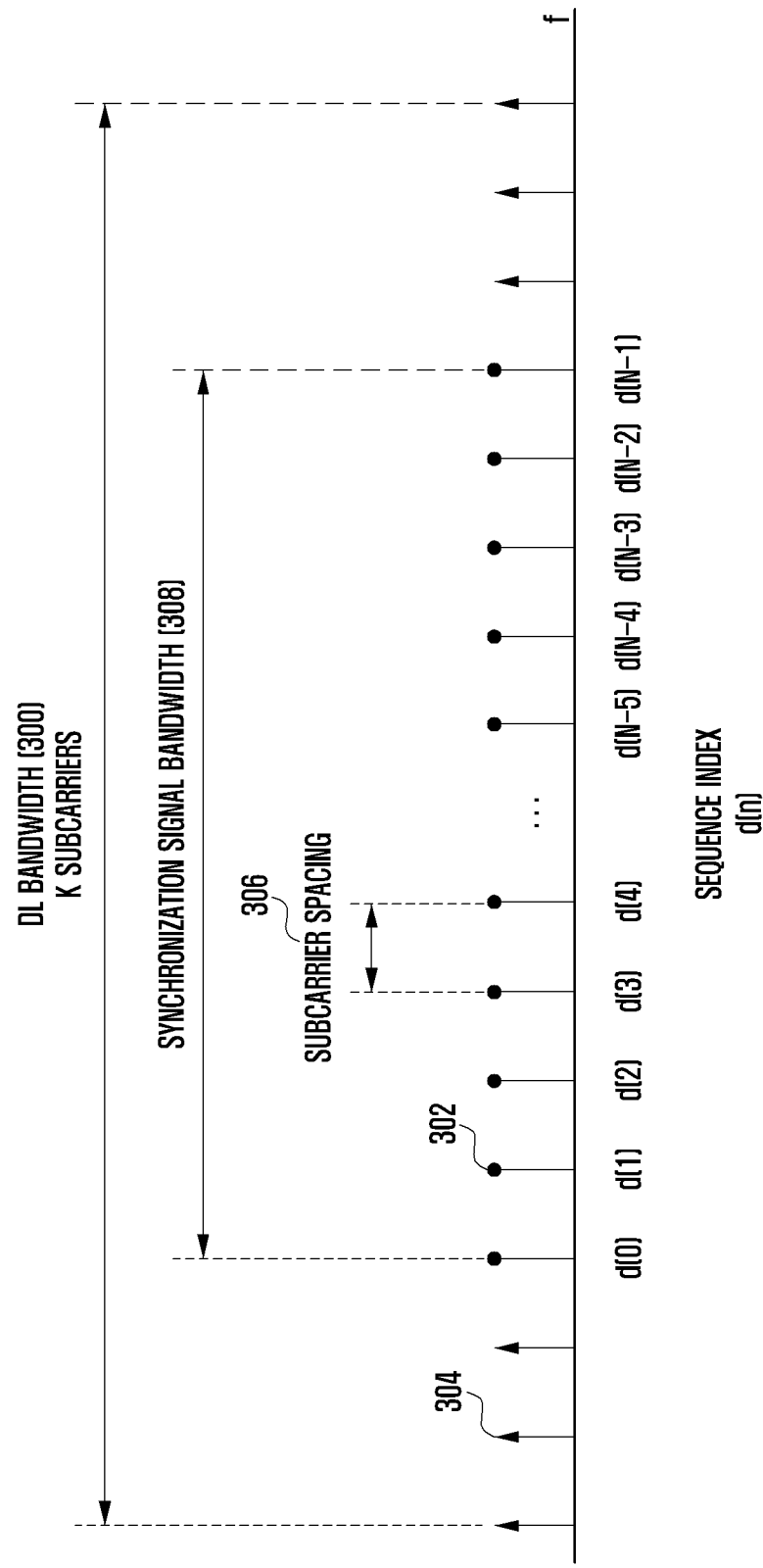
FIG. 3A is a diagram illustrating a method of generating a first synchronization signal and a second synchronization signal in a frequency domain.

FIG. 3A is a diagram illustrating a method of generating a first synchronization signal and a second synchronization signal in a frequency domain. Specifically, FIG. 3A is a diagram illustrating a method of mapping the sequence of the first synchronization signal and the second synchronization signal in the frequency domain to generate the first synchronization signal and the second synchronization signal.

An OFDM symbol for transmitting a DL signal of the 5G communication system is composed of K subcarriers in a DL bandwidth 300. The K subcarriers 302 and 304 are located in the frequency domain while being spaced apart from each other in units of subcarrier spacing 306. The K subcarriers constituting the OFDM symbol through which the synchronization signal is transmitted can be divided into the subcarrier 302 for transmission of the synchronization signal and the subcarrier 304 used for data transmission. The subcarrier 304 used for data transmission may not be used for data transmission and may not transmit any signal if not necessary.

The subcarrier 302 for transmission of the synchronization signal may be transmitted by mapping a sequence for the synchronization signal to N subcarriers within a synchronization signal transmission bandwidth 308. At this time, the sequence used for generation of the first synchronization signal and the second synchronization signal is also composed of N samples. The number N of subcarriers for synchronization signal transmission may be determined by the length of the sequence used for the first synchronization signal and the second synchronization signal. Assuming that the sequence used for the first and second synchronization signals is $d(n)$ ($n=0$ to $N-1$), $d(n)$ is mapped starting from a lower subcarrier index among subcarriers existing within the synchronization signal bandwidth. The sequence constituting the first synchronization signal and the second synchronization signal may be composed of one or a plurality of sequences, or may be mapped to each subcarrier by modulating cell information. A method of generating the sequence for generating the first synchronization signal and the second synchronization signal may vary depending on a role performed by each synchronization signal and required performance.

Referring to FIG. 3A, it can be seen that the transmission bandwidth of the synchronization signal is smaller than or equal to the DL bandwidth for data transmission. In LTE or LTE-A, the synchronization signal is transmitted in a 1.4 MHz bandwidth narrower or equal to the DL bandwidth, and is transmitted per subcarrier. Such a synchronization signal structure can satisfy initial or/and coarse synchronization performance in which errors in a CP are synchronized at the time of synchronization signal-based time and frequency synchronization due to high sequence density. However, the synchronization signal structure is insufficient to satisfy fine synchronization performance for data signal demodulation due to the limitation of the signal bandwidth.

Meanwhile, in LTE or/and LTE-A, there are wideband signals that are always transmitted according to a given period and offset, such as a cell-specific reference signal (CRS), a channel state information reference signal (CSI-RS), and the like, by which the terminal can satisfy accurate synchronization performance required for data signal demodulation. The 5G communication system should support higher data transmission efficiency compared to LTE and LTE-A, whereas always-on signals such as CRS are further reduced, so that it is important to secure a method of achieving accurate synchronization performance of the terminal.

The disclosure proposes a method and an apparatus for achieving accurate synchronization performance of a terminal on the basis of a synchronization signal or various reference signals in the 5G communication system.

First Embodiment

In the first embodiment, time/frequency tracking requirements according to various environments such as SCS, OFDM symbol duration, channel delay spread, Doppler spread, and the like are summarized and a tracking reference signal (RS) design method is summarized accordingly. The tracking RS may be referred to as various names such as TRS, CSI-RS, demodulation reference signal (DMRS), a common control RS, and the like in the disclosure or actual implementation thereof. However, the purpose of the tracking RS is to ensure accurate synchronization performance of the terminal for demodulating a wideband signal after coarse synchronization on the basis of a first synchronization signal (PSS), a second synchronization signal (SSS), or a third synchronization signal (TSS).

One of the most important factors in designing the tracking RS structure is to determine spacing of time and frequency domains of resource elements (REs) for reference signal transmission. According to the Nyquist sampling theorem, the number of subcarriers $D_f$ between REs of the reference signal required in the frequency domain must satisfy the following equation 1.

$$D_f \leq \frac{1}{\tau_{max}\Delta_f} \quad \text{[Equation 1]}$$

In Equation 1, $\tau_{max}$ denotes a maximum excess delay of a channel, and $\Delta_f$ denotes SCS. If a reference signal RE interval in the frequency domain does not satisfy the above condition, accurate channel estimation may be difficult due to aliasing of a channel impulse response in the time domain. Similarly, the number of OFDM symbols $D_t$ between reference signal REs required in the time domain must satisfy the following equation 2.

$$D_t \leq \frac{1}{2f_{d,max}T_{sym}} \quad \text{[Equation 2]}$$

In Equation 2, $f_{d,max}$ denotes a maximum Doppler spread, and $T_{sym}$ denotes an OFDM symbol length. If a reference signal RE interval in the time domain does not satisfy the above condition, the RS interval becomes longer than coherence time of a channel, by which accurate channel estimation may become difficult.

Meanwhile, a fixed SCS value of $\Delta_f=15$ kHz is used in LTE, but in the case of NR, it is possible to use variable SCS values such as $\Delta_f\in\{15,30,60\}$kHz at a carrier frequency below 6 GHz (B6G, below 6 GHz) and $\Delta_f\in\{60,120,240\}$kHz at a carrier frequency above 6 GHz (A6G, above 6 GHz), and the OFDM symbol length can also be varied in inverse proportion to the SCS. For example, in case of $\Delta_f=15$ kHz, the OFDM symbol length $T_{sym}$ is about 71.5 us including a CP (a first OFDM symbol of a slot is 71.875 us and the remaining OFDM symbols are 71.354 us), but in case of $\Delta_f=30$ kHz, the OFDM symbol length $T_{sym}$ is shortened to about 36 us. An approximate length of the OFDM symbol according to SCS is shown in Table 1 below. In Table 1, the decimal places of the OFDM symbol length are omitted and may include an error of about 5%.

TABLE 1

| SCS [kHz] | 15 | 30 | 60 | 120 | 240 |
|---|---|---|---|---|---|
| Symbol duration [us] | 71.4 | 35.7 | 17.8 | 8.9 | 4.5 |

The maximum excess delay of the channel is different according to a channel environment (model), and in case of an LTE multi-path fading model, Table 2 below is obtained.

TABLE 2

| Model | Number of channel taps | Delay spread (r.m.s.) | Maximum excess tap delay (span) |
|---|---|---|---|
| Extended Pedestrian A (EPA) | 7 | 45 ns | 410 ns |
| Extended Vehicular A model (EVA) | 9 | 357 ns | 2510 ns |
| Extended Typical Urban model (ETU) | 9 | 991 ns | 5000 ns |

In case of an NR channel model (3GPP TR 38.900), the maximum excess delay of the channel is determined by the product of a normalized delay $\tau_{n,model}$ and a scaling factor $DS_{desired}$, and the detailed values are shown in Table 3 below for an UMa channel model and Table 4 below for an UMi channel model. In Tables 3 and 4, TDL-A to -E among the models of 3GPP TR 38.900 were used as examples.

TABLE 3

| | | Carrier frequency [GHz] | | | |
|---|---|---|---|---|---|
| | | 2 | 6 | 28 | 60 |
| $\tau_{n,model}$ | $DS_{desired}$ | 1156 | 1149.4 | 839.4 | 718.6 |
| Channel model | TDL-A 9.6586 | 11.165 | 11.102 | 8.107 | 6.941 |
| | TDL-B 4.7834 | 5.530 | 5.498 | 4.015 | 3.437 |
| | TDL-C 8.6523 | 10.002 | 9.945 | 7.263 | 6.218 |
| | TDL-D 12.525 | 14.479 | 14.396 | 10.513 | 9.000 |
| | TDL-E 19.514 | 22.558 | 22.429 | 16.380 | 14.023 |

Maximum excess tap delay [us]

TABLE 4

| | | Carrier frequency [GHz] | | | |
|---|---|---|---|---|---|
| | | 2 | 6 | 28 | 60 |
| $\tau_{n,model}$ | $DS_{desired}$ | 281 | 306.8 | 304.5 | 303.3 |
| Channel model | TDL-A | 9.6586 | 2.714 | 2.963 | 2.941 | 2.929 |
| | TDL-B | 4.7834 | 1.344 | 1.468 | 1.457 | 1.451 |
| | TDL-C | 8.6523 | 2.431 | 2.655 | 2.635 | 2.624 |
| | TDL-D | 12.525 | 3.520 | 3.843 | 3.814 | 3.799 |
| | TDL-E | 19.514 | 5.483 | 5.987 | 5.942 | 5.919 |

Maximum excess tap delay [us]

If the values of Tables 1, 2, 3 and 4 are substituted into Equation 1, the number of subcarriers $D_f$ between reference signal REs required in the frequency domain can be obtained according to Table 5 (FIG. 3B), Table 6 (FIG. 3C), Table 7 (FIG. 3D), Table 8 (FIG. 3E) and Table 9 (FIG. 3F) depending on conditions. FIGS. 3B, 3C, 3D, 3E and 3F are drawings showing Tables 5 to 9, respectively. According to Table 5, it can be seen that accurate channel estimation can be performed when at least one reference signal RE exists for each 13 REs on a frequency axis, that is, at least one reference signal RE exists for each single PRB in an LTE channel of CF=2 GHz. On the other hand, referring to Tables 6, 7 and 8, it can be seen that the reference signal RE should exist in two adjacent REs especially when the SCS is large (240 kHz for example) in a carrier frequency of 6 GHz or more.

In Tables 5, 6, 7, and 8, reference numeral 320 denotes a region which is not used according to the CF configuration of A6G or B6G, reference numeral 310 denotes a region in which accurate channel estimation is possible when a reference signal is transmitted for every six RE (subcarrier), regions 310 and 330 are regions in which accurate channel estimation is possible when RSs are transmitted for each of two REs (subcarriers), and regions 310, 330 and 340 are regions in which accurate channel estimation is possible when RSs are transmitted to two adjacent REs (subcarriers).

The number of OFDM symbols $D^t$ between the reference signal REs required in the time domain can also be obtained through a process similar to the above. A maximum Doppler shift $f_{d,max}$ according to the speed of the terminal and the carrier frequency is obtained as shown in Table 10.

TABLE 10

| | CF | 2 | 6 | 28 | 60 | [GHz] |
|---|---|---|---|---|---|---|
| UE mobility | 30 km/h | 0.06 | 0.17 | 0.78 | 1.67 | [kHz] |
| | 60 km/h | 0.11 | 0.33 | 1.56 | 3.33 | [kHz] |
| | 120 km/h | 0.22 | 0.67 | 3.11 | 6.67 | [kHz] |
| | 350 km/h | 0.65 | 1.94 | 9.07 | 19.44 | [kHz] |
| | 500 km/h | 0.93 | 2.78 | 12.96 | 27.78 | [kHz] |

When the values of Tables 1 and 10 are substituted into Equation 2, the number of OFDM symbols $D_t$ between the reference signal REs required in the time domain can be obtained from Table 11 (FIG. 3G), Table 12 (FIG. 3H), and Table 14 (FIG. 3J) depending on situations. FIGS. 3G, 3H, 3I, and 3J are drawings showing Tables 11 to 14, respectively. According to Table 11, Table 12, Table 13, and Table 14, when there are one or more reference signal REs for every 14 or 7 RE in the time domain, that is, for each slot, it can be seen that accurate channel estimation can be performed in almost all cases.

In Tables 11, 12, 13, and 14, reference numeral 320 denotes an unused region according to the carrier frequency configuration of A6G or B6G, reference numeral 310 denotes a region in which accurate channel estimation is possible when reference signals are transmitted for every 14 RE (OFDM symbol), regions 310 and 330 are regions in which accurate channel estimation is possible when reference signals are transmitted for every 7 RE (OFDM symbol), and regions 310, 330, and 340 are regions in which the reference signal REs should be distributed at a distance shorter than 7 REs for accurate channel estimation.

Figure 4:
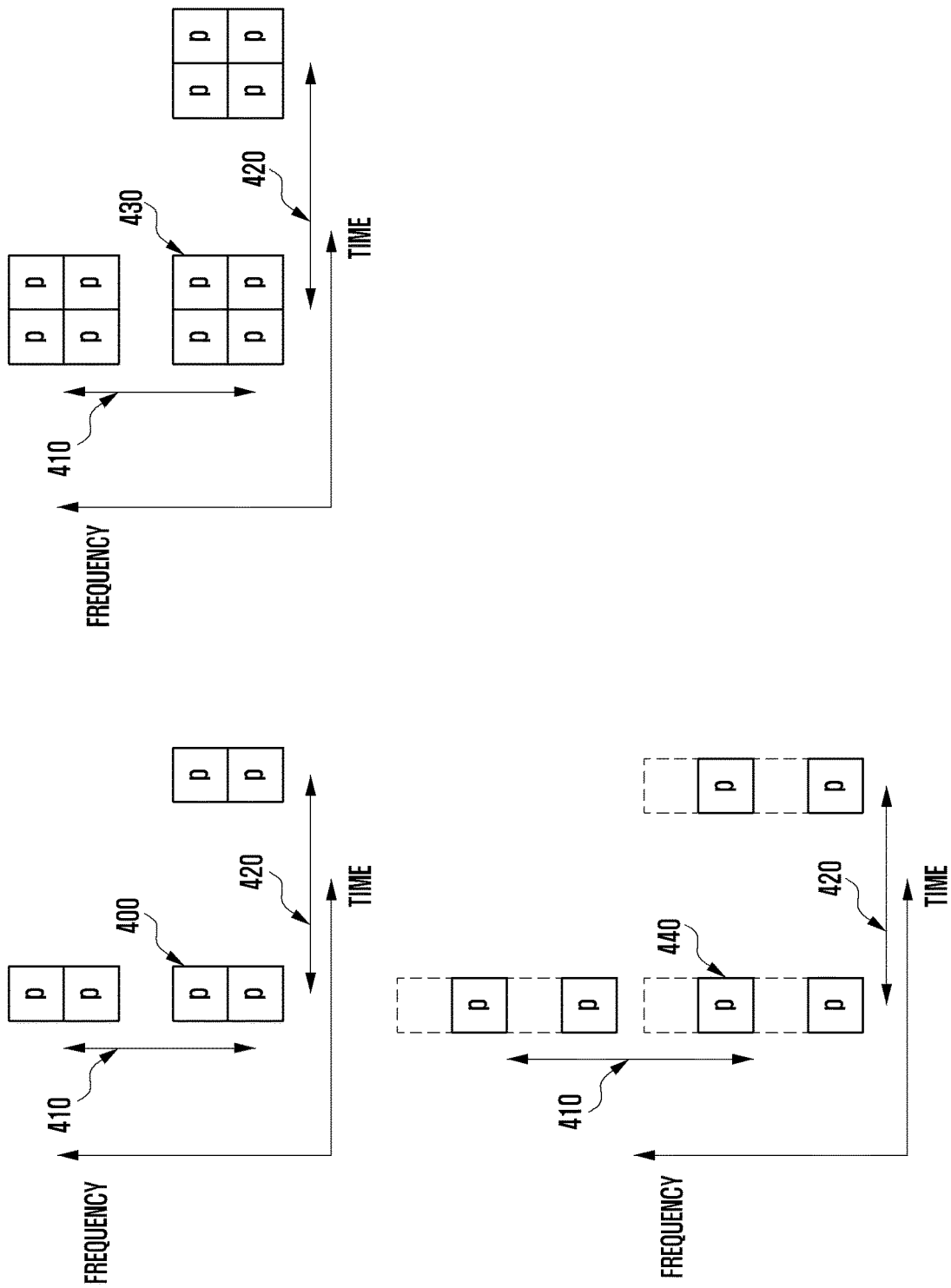
FIG. 4 is a diagram illustrating examples of tracking reference signal RE patterns satisfying the above requirement.

FIG. 4 is a diagram illustrating examples of tracking reference signal RE patterns satisfying the above requirement. It is possible that the examples of FIG. 4 are applied under at least one condition of CF A6G and B6G. Reference numeral 400 denotes a basic pattern composed of two REs adjacent to each other on the frequency axis, and a plurality of 400 RE patterns may exist at every constant frequency interval 410 within a given frequency band and at every constant time interval 420 within a given time period. For example, the given frequency band may be a partial bandwidth or a system bandwidth set by an higher layer, and the given time may be defined by a transmission interval which is set by an higher layer signaling or predetermined and/or the number of times of tracking reference signal transmission which is set by an higher layer signaling or predetermined from a transmission start point of tracking reference signal which is set by an higher layer or predetermined. The frequency interval 410 may be defined or set as one of one physical resource block (PRB) (i.e., 12 subcarriers), 6 subcarriers, or 4 subcarriers. The time interval 420 may be defined/set as one of 14 OFDM symbols, 7 OFDM symbols, or 4 symbols.

Reference numeral 430 is a basic pattern composed of four REs adjacent to each other on the frequency axis and time axis, and a plurality of RE patterns 430 may exist at every constant frequency interval 410 within a given frequency band and at every constant time interval 420 within a given time. A detailed description thereof is similar to the case of 400, so the description thereof is omitted.

Reference numeral 440 is a basic pattern composed of a plurality of even-numbered or odd-numbered REs, and a plurality of RE patterns 440 may exist at every constant frequency interval 410 within a given frequency band and at every constant time interval 420 within a given time. A detailed description thereof is similar to the case of 400, so the description thereof is omitted.

The basic patterns 400, 430 and 440 may be subjected to FDM or/and TDM or/and code division multiplexing (CDM), but CDM may not be applied for accurate time and frequency estimation performance.

An actual tracking reference signal RE pattern is not limited to the example of FIG. 4, but other patterns provided in the second and subsequent embodiments below may be applied.

Second Embodiment

In the second embodiment, a method in which a terminal performs time and frequency tuning for data demodulation on the basis of a synchronization signal (a first synchronization signal and a second synchronization signal) and a CSI-RS is proposed.

The CSI-RS for reporting channel state information (CSI) can be roughly divided into two levels according to its use.

A first level CSI-RS (Level-1 CSI-RS, level-1 CSI-RS) is intended for non-UE-specific use case, and may be used to perform CSI measurement, radio resource management (RRM) measurement, or the like. To this end, it is possible to apply a beam having a cell-specific or group-specific wide range to the level-1 CSI-RS, and the level-1 CSI-RS is transmitted in wideband. If a large number of antenna elements are included in a transmission and reception point (TRP) antenna array of a base station gNB, the gNB may allow a terminal to acquire CSI according to the antenna array through the CSI-RS and can use the following two methods.

In the first method, a plurality of antenna elements are bundled into one CSI-RS antenna port (hereinafter, referred to as a CSI-RS port) and transmitted to a terminal by applying a beam to the plurality of antenna elements. It is not necessary for one CSI-RS resource to include a large number of CSI-RS ports (for example, 16 CSI-RS ports or less may be included per resource) since the plurality of antenna elements are bundled into one CSI-RS port. In this case, the base station may set multiple level-1 CSI-RS resources and apply different beam directions to each resource to establish a plurality of virtual sectors in one cell or transmission and receiving point (TRP). The terminal can select and report its preferred resource(s) from among the multiple Level-1 CSI-RS resources. In this case, a beam in the same (or similar) direction is applied to the CSI-RS ports included in one CSI-RS resource.

The second method is a method of including a plurality of CSI-RS ports (e.g., 16 ports or more) to one CSI-RS resource and transmitting the CSI-RS to the terminal by applying a beam to a relatively smaller number of antenna elements compared to the first method. In this case, the terminal may acquire raw channel information and the CSI calculation complexity per CSI-RS resource increases, but it is possible to obtain a more accurate CSI.

The second level CSI-RS (level-2 CSI-RS, level-2 CSI-RS) is intended for UE-specific use case and can be used to perform CSI measurement. Since the level-2 CSI-RS is used for UE-specific, a beam having UE-specific beam direction for each terminal and a narrow coverage can be applied to the level-2 CSI-RS, and the level-2 CSI-RS can be transmitted in a partial-band manner. The level-2 CSI-RS has disadvantages that a CSI-RS beam gain is larger than the level-1 CSI-RS due to its characteristics, but it may be difficult to share the level-2 CSI-RS between arbitrary terminals and the overhead of the CSI-RS resources is increased according to the number of terminals.

For the transmission of the level-1 CSI-RS and the level-2 CSI-RS, the base station informs the terminal of at least the following information through higher layer signaling (radio resource control (RRC)), medium access control (MAC) layer signaling, or physical layer (L1 signaling or downlink control information (DCI).

1. The number of CSI-RS ports
2. CSI-RS configuration (Position of CSI-RS RE within PRB)
3. CSI-RS transmission timing information (period, offset, and the like)
4. CSI-RS power boosting information In the 5G communication system, the payload of each piece of information may be very large in order to cope with various environments. For example, the number of CSI-RS ports needs to be variously set to {2, 4, 8, 12, 16, 32, and 64} in accordance with the shape of the antenna array of the base station and the CSI-RS operating method described above. Also, even in the case of CSI-RS configuration, it is necessary to designate 20 CSI-RS RE pattern positions or more in consideration of various interference conditions, forward/backward compatibility secure, and the like in the 5G communication system due to a plurality of numerologies or the like. The case of CSI-RS transmission timing and power boosting information is also similar to this. Accordingly, it is difficult to announce all of them through physical layer signaling. If dynamic signaling for a specific element is required, a method of signaling a plurality of pairs on the above-mentioned information through an higher layer and then selecting one of them through physical layer signaling should be used.

As described above, the LTE PBCH transmits a master information block (MIB). The MIB contains only minimum information necessary for the terminal to access the base station for ensuring sufficient coverage, and is transmitted in a narrow band compared to the system bandwidth. Other configuration information such as cell selection information, RRC configuration information, or the like is transmitted in a physical DL PDSCH region through system information blocks (SIBs), and transmitted over a wide band compared to the PBCH.

Since MIB decoding performance greatly affects the terminal operation after the reception of the MIB, only minimum configuration information should be transmitted to the MIB even in the 5G communication system considering the MIB coverage. Meanwhile, considering the decoding performance of the SIB transmitted over a wide band, a level-1 CSI-RS, which is transmitted over a wide band in a band other than the synchronization signal to be transmitted in a band similar to the PBCH, may be further used for time and frequency synchronization of the terminal. If the terminal desires to use the level-1 CSI-RS for SIB decoding, it may not be possible to use all of the CSI-RS configuration information because the terminal receives the SIB before receiving higher layer signaling. To solve this problem, the MIB of the 5G communication system includes configuration information related to a level-1 CSI-RS (or a tracking reference signal, TRS) of a maximum of 4 bits or less as follows.

1. The number of CSI-RS ports (P)
2. CSI-RS configuration (location of CSI-RS RE pattern in PRB according to number of CSI-RS ports)
3. CSI-RS transmission timing information (cycle, offset, etc.)

The level-1 CSI-RS configured through the MIB has cell-specific or group-specific characteristics because all terminals receiving the MIB share the same configuration information.

The MIB does not need to include all of the setting information but may include only some information such as {number of ports, CSI-RS configuration}, {CSI-RS configuration, timing information}, {number of ports, timing information}, and the like. The information omitted in the configuration information may be set to a specific value in advance in the specification or may be announced to the terminal through another channel such as SIB.

For example, when {number of ports, CSI-RS configuration} is configured through the MIB, it is ensured that timing information of the level-1 CSI-RS for time and frequency synchronization is determined by a synchronization signal (for example, PSS or SSS). This means that the CSI-RS transmission timing is determined on the basis of the transmission timing of the synchronization signal. For example, the level-1 CSI-RS configured by the MIB can be ensured to be transmitted in all or part of a subframe or/and slot in which the synchronization signal is transmitted.

If {CSI-RS configuration, timing information} is configured through the MIB, the number of ports of the level-1

CSI-RS for time and frequency synchronization can be predetermined to a certain number. In the simplest example, the number of ports of the level-1 CSI-RS for time and frequency synchronization is ensured to always be one. Although the timing information may explicitly indicate a period and an offset at which the level-1 CSI-RS is transmitted, it is ensured that the transmission period of the level-1 CSI-RS for time and frequency synchronization is a value indicating what times (N) the period of the synchronization signal on the basis of the period of the synchronization signal. In this case, the timing information may be as shown in Table 16 below.

If {number of ports, timing information} is configured through the MIB, the level-1 CSI-RS for time and frequency synchronization can be ensured to always be transmitted on the basis of the same CSI-RS configuration. At this time, an exact RE pattern at which the level-1 CSI-RS is transmitted is determined by a combination of the number of ports set by the MIB and a predetermined CSI-RS configuration. That is, it is possible to change the number of CSI-RS REs used depending on the number of ports set by the MIB. Although the timing information may explicitly indicate a period and an offset at which the level-1 CSI-RS is transmitted, it is ensured that the transmission period of the level-1 CSI-RS for time and frequency synchronization is a value indicating what times (N) the period of the synchronization signal on the basis of the period of the synchronization signal.

For example, it is assumed that one SS burst is composed of M SS blocks and one SS burst set is composed of N SS bursts. In this case, the base station has a total of M×N SS blocks so that PSS, SSS, or/and TSS, or PBCH can be transmitted through a maximum of M×N different beams. The terminal may receive at least one SS block, i.e., PSS, SSS, or/and TSS, and PBCH, and may acquire period and offset information of the transmission of the level-1 CSI-RS (TRS, tracking reference signal) corresponding to each SS block. At this time, the transmission period and offset of the level-1 CSI-RS can be explicitly or implicitly configured so that the transmission timing of the level-1 CSI-RS is related to the transmission timing of the MIB or SIB (the level-1 CSI-RS is transmitted earlier than the MIB or SIB by X OFDM symbols or/and slots within the same slot). As an example of the explicit or implicit configuration of the relationship between the SS block and the level-1 CSI-RS, it is possible to define the correlation between an SS block index and an index of the level-1 CSI-RS resource as shown in Equation 3 below.

$$i_{TRS} = i_{SS} \bmod N_{TRS} \quad \text{[Equation 3]}$$

Equation 3 is an example of a correlation that can be defined between the SS block index and the level-1 CSI-RS resource index. In Equation 3, $i_{SS}$ denotes the index of the SS block, $N_{TRS}$ denotes a total number of configurable level-1 CSI-RS (tracking reference signal (TRS)) resources, and $i_{TRS}$ denotes the index of the level-1 CSI-RS (TRS) resource determined by the corresponding SS block index.

In an example in which a plurality of SS blocks are transmitted, the terminal may assume that the SS block and the level-1 CSI-RS (TRS) associated with each other are quasi co-located (hereinafter, referred to as QCL). This means that the terminal can share large scale parameter estimation and beam-reated information, such as coarse time/frequency tracking for the associated level-1 CSI-RS (TRS) measurement, Doppler spread, or delay spread through the SS block.

Table 15 below shows an example in which {number of ports, CSI-RS configuration} is configured by a 3-bit payload in the MIB among the above examples. Four code points of a total of eight code points are used for the CSI-RS configuration for the level-1 CSI-RS for time and frequency synchronization composed of one port, and two code points and one code point are used for a case having two and four CSI-RS ports. The remaining one code point is reserved. This is obtained by considering that the number of CSI-RS resources that can be defined is reduced along with an increase in the number of CSI-RS ports included in one CSI-RS resource when the same number of CSI-RS RE sesources are assumed. At least one of the code points may mean turn-off of the level-1 CSI-RS (tracking reference signal).

Table 15 is an example of a case where the level-1 CSI-RS related configuration of the MIB has a 3-bit payload and the MIB informs the number of ports of the level-1 CSI-RS and the CSI-RS configuration information. Here, Table 15 may be extended in a similar manner for the other descriptions above.

TABLE 15

| MIB (3 bits) | Contents |
| --- | --- |
| 0 | P = 1, CSI-RS configuration #0 |
| 1 | P = 1, CSI-RS configuration #1 |
| 2 | P = 1, CSI-RS RE configuration #2 |
| 3 | P = 1, CSI-RS RE configuration #3 |
| 4 | P = 2, CSI-RS RE configuration #0 |
| 5 | P = 2, CSI-RS RE configuration #1 |
| 6 | P = 4, CSI-RS RE configuration #0 |
| 7 | Reserved |

The following Table 16 shows an example in which {CSI-RS configuration, timing information} is configured by a 4-bit payload in the MIB among the above examples. Four code points are respectively used for cases where the transmission period of the level-1 CSI-RS is 1, 2, 4, and 8 times the transmission period of the SS block. It is assumed that a total of four CSI-RS configurations are available.

Table 16 is an example of a case where the level-1 CSI-RS related configuration of the MIB has a 4-bit payload and the MIB informs the CSI-RS configuration of the level-1 CSI-RS and the timing information. Here, Table 16 may be extended in a similar manner for the other descriptions above. In a similar manner to that in Table 15, at least one of the code points may mean turn-off of the level-1 CSI-RS (tracking reference signal).

TABLE 16

| MIB (4 bits) | Contents |
| --- | --- |
| 0 | CSI-RS config. #0, period N = 1 |
| 1 | CSI-RS config. #1, period N = 1 |
| 2 | CSI-RS config. #2, period N = 1 |
| 3 | CSI-RS config. #3, period N = 1 |
| 4 | CSI-RS config. #0, period N = 2 |
| 5 | CSI-RS config. #1, period N = 2 |
| 6 | CSI-RS config. #2, period N = 2 |
| 7 | CSI-RS config. #3, period N = 2 |
| 8 | CSI-RS config. #0, period N = 4 |
| 9 | CSI-RS config. #1, period N = 4 |
| 10 | CSI-RS config. #2, period N = 4 |
| 11 | CSI-RS config. #3, period N = 4 |
| 12 | CSI-RS config. #0, period N = 8 |
| 13 | CSI-RS config. #1, period N = 8 |
| 14 | CSI-RS config. #2, period N = 8 |
| 15 | CSI-RS config. #3, period N = 8 |

In the above Tables and descriptions, the CSI-RS configurations configured by the MIB may indicate individually defined patterns for time and frequency synchronization, but can be ensured to indicate some of CSI-RS configurations configured by the above-described upply layer signaling.

Table 17 below is an example of a case where {timing information} is configured by a 3-bit payload of the MIB among the above examples. Two and four code points may be respectively used to transmit offset information for cases where the transmission period of the level-1 CSI-RS is two and four times the transmission period of the SS block. At this time, the terminal may assume a single CSI-RS configuration composed of a single port. In a similar manner to the case of Table 15, at least one of the code points may mean turn-off of the level-1 CSI-RS (tracking reference signal). According to Table 17, it can be seen that the level-1 CSI-RS is transmitted at N times the transmission period of the SS block and at the time when the configured offset is applied, on the basis of the time away from the measured SS block or MIB and/or SIB transmission timing by X OFDM symbols or slots. Here, X is an integer greater than or equal to zero.

TABLE 17

| 3 bits | Contents |
| --- | --- |
| 0 | Level-1 CSI-RS turn off |
| 1 | period N = 2, offset = 0 |
| 2 | period N = 2, offset = 1 |
| 3 | period N = 4, offset = 0 |
| 4 | period N = 4, offset = 1 |
| 5 | period N = 4, offset = 2 |
| 6 | period N = 4, offset = 3 |
| 7 | Reserved |

In the examples of Tables 15, 16, and 17, it is obvious that the payload of each example and the structure of the code point corresponding thereto can be mutually compatible with each other, so a description of the detail payload is omitted.

Next, detailed RE patterns of the level-1 CSI-RS for time/frequency synchronization will be described.

A detailed RE pattern design of the level-1 CSI-RS for time and frequency synchronization requires the following three conditions to be considered.

1) Time and frequency synchronization performance and reference signal overhead

2) Structure of SS block such as first synchronization signal, second synchronization signal, and broadcast channel of 5G communication system 3) Backward compatibility Considering time and frequency synchronization performance and reference signal overhead, the detailed RE pattern of the level-1 CSI-RS may vary depending on a) whether to design to enable their own time and frequency synchronization via CSI-RS, or b) whether to design to enable time and frequency synchronization through a combination of CSI-RS and SS block signals.

Considering the structure of the SS block of the 5G communication system, the detailed RE pattern of the level-1 CSI-RS may vary depending on c) whether the SS block is to be transmitted in one slot or minislot, or d) whether the SS block is to be transmitted in multiple (e.g., two) consecutive slots or minislots.

Considering backward compatibility, it is possible to design the detailed RE pattern of the level-1 CSI-RS according to various factors such as e) whether to design to avoid existing signals such as LTE and LTE-A's CRS, or f) whether LTE and LTE-A terminals can perform rate matching in consideration of the level-1 CSI-RS of the 5G communication system.

Figure 5:
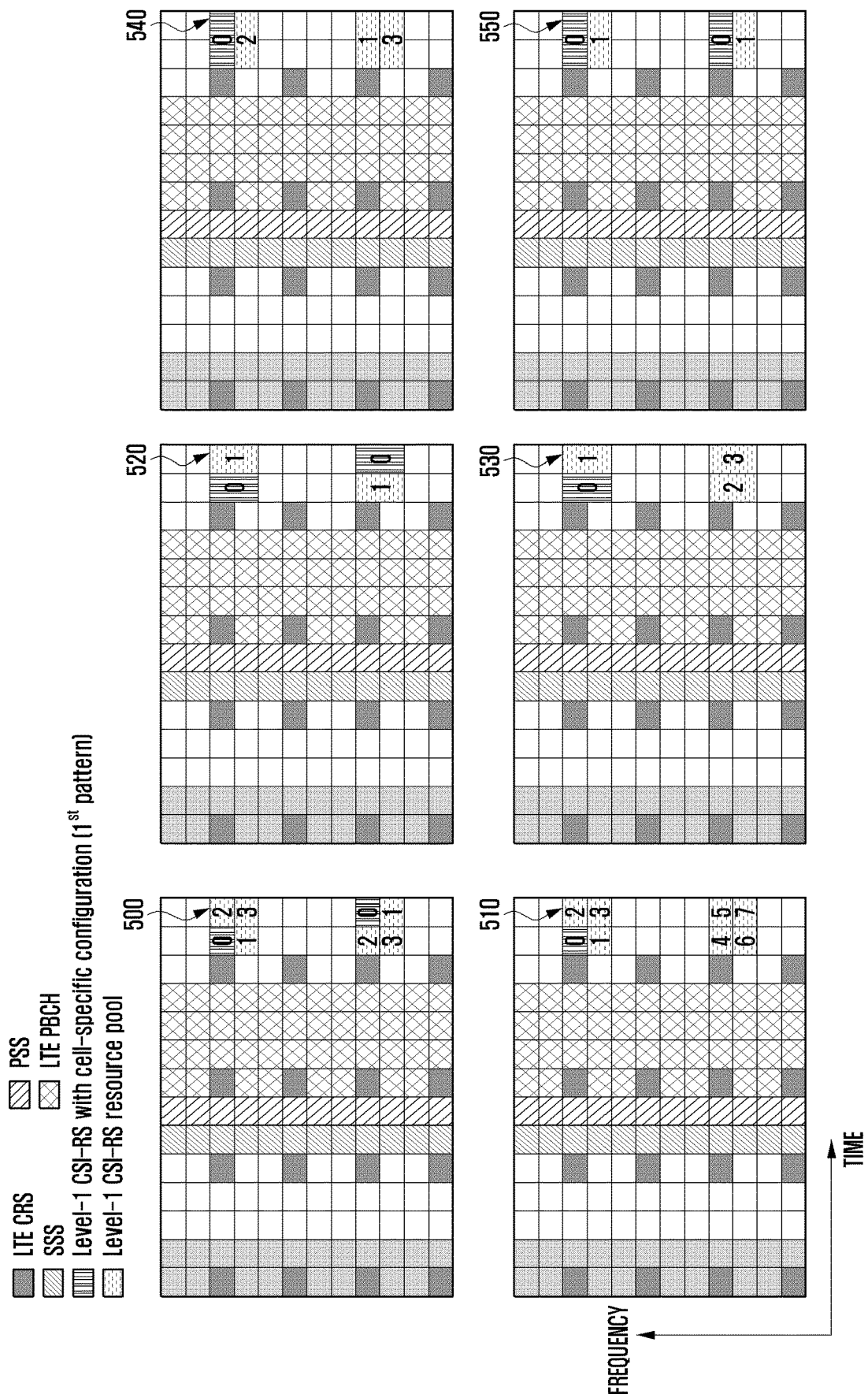
FIG. 5 is a diagram illustrating an example of a detailed RE pattern of a level-1 CSI-RS for time and frequency synchronization.

FIG. 5 is a diagram illustrating an example of a detailed RE pattern of a level-1 CSI-RS for time and frequency synchronization. Each example of FIG. 5 shows the RE pattern of each piece of signal based on one PRB in the 5G communication system. At this time, it is assumed that one PRB is composed of 12 subcarriers and 14 OFDM symbols. In the example of FIG. 5, considering both "e) whether to design to avoid existing signals such as LTE and LTE-A's CRS" and "f) whether LTE and LTE-A terminals can perform rate matching in consideration of the level-1 CSI-RS of the 5G communication system" among the above-described elements, the level-1 CSI-RS for time and frequency synchronization is transmitted in a level-1 CSI-RS resource pool located in the 13th and 14th OFDM symbols. The numbers in the RE in each pattern in FIG. 5 represent the port or resource index of the level-1 CSI-RS, and the terminal estimates a channel in the REs to which the CSI-RS of the same port is transmitted and performs time and frequency synchronization with the received signal.

In the case of a pattern 500, a CSI-RS corresponding to one CSI-RS port is transmitted from REs located at different time and frequency resources, so that time and frequency synchronization can be performed only by CSI-RS, and up to four CSI-RS ports in on PRB can be configured and the CSI-RS can be transmitted accordingly. Similar to the pattern 500, in a pattern 510, the CSI-RS corresponding to one port is transmitted from one RE and the CSI-RS according to each port is transmitted from one resource per PRB. In this case, it is difficult to perform time synchronization only through the level-1 CSI-RS, and time and frequency synchronization are performed in combination with the signals of the SS block.

In a pattern 520, since the CSI-RS corresponding to one CSI-RS port is transmitted from REs located at different time and frequency resources, time and frequency synchronization can be performed only using the CSI-RS. In the pattern 520, it is assumed that an orthogonal cover codes (OCC) is applied to two adjacent REs on the frequency axis for coexistence with the CSI-RS after the RRC is configured, and up to two CSI-RS ports or resources in one PRB can be configured and the CSI-RS can be transmitted accordingly. Similar to the pattern 520, in a pattern 530, the CSI-RS of one port is transmitted from two REs and the CSI-RS according to each port is transmitted from one resource per PRB. In this case, it is difficult to perform time synchronization only through the level-1 CSI-RS, and time and frequency synchronization are performed in combination with the signals of the SS block.

In patterns 540 and 550, a CSI-RS corresponding to one CSI-RS port is spread and transmitted through the OCC applied to two adjacent REs on the time axis. This is to facilitate coexistence with the LTE-A CSI-RS. The pattern 540 is an RE pattern when up to four level-1 CSI-RS resources are operated, where each resource can have up to two CSI-RS ports. The pattern 550 is an RE pattern when up to two level-1 CSI-RS resources are operated, where each resource can have up to four CSI-RS ports.

Another advantage of the examples provided in FIG. 5 is that the level-1 CSI-RSs according to the above example can be used as reference signals for adaptive gain control (AGC). Since the level-1 CSI-RSs are signals to be transmitted over a wide band, terminals whose data transmission bandwidths are changed can perform AGC through the level-1 CSI-RS received most recently. Alternatively, if the base station changes the data transmission bandwidth of the terminal, the base station can ensure to transmit the level-1 CSI-RS to the immediately preceding subframe of a changed subframe.

Figure 6A:
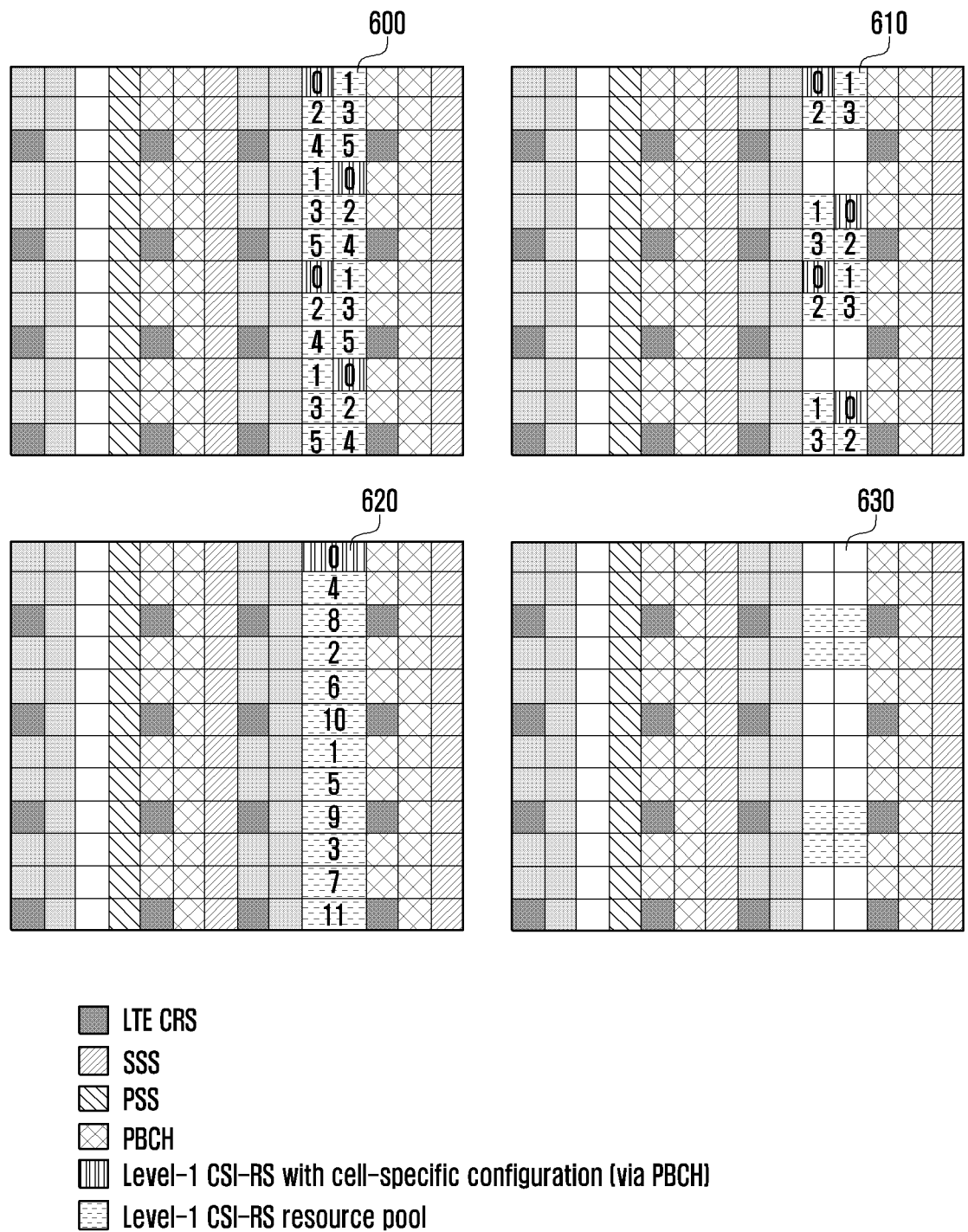
FIGS. 6A and 6B are diagrams illustrating other examples of a detailed RE pattern of a level-1 CSI-RS for time and frequency synchronization.
Figure 6B:
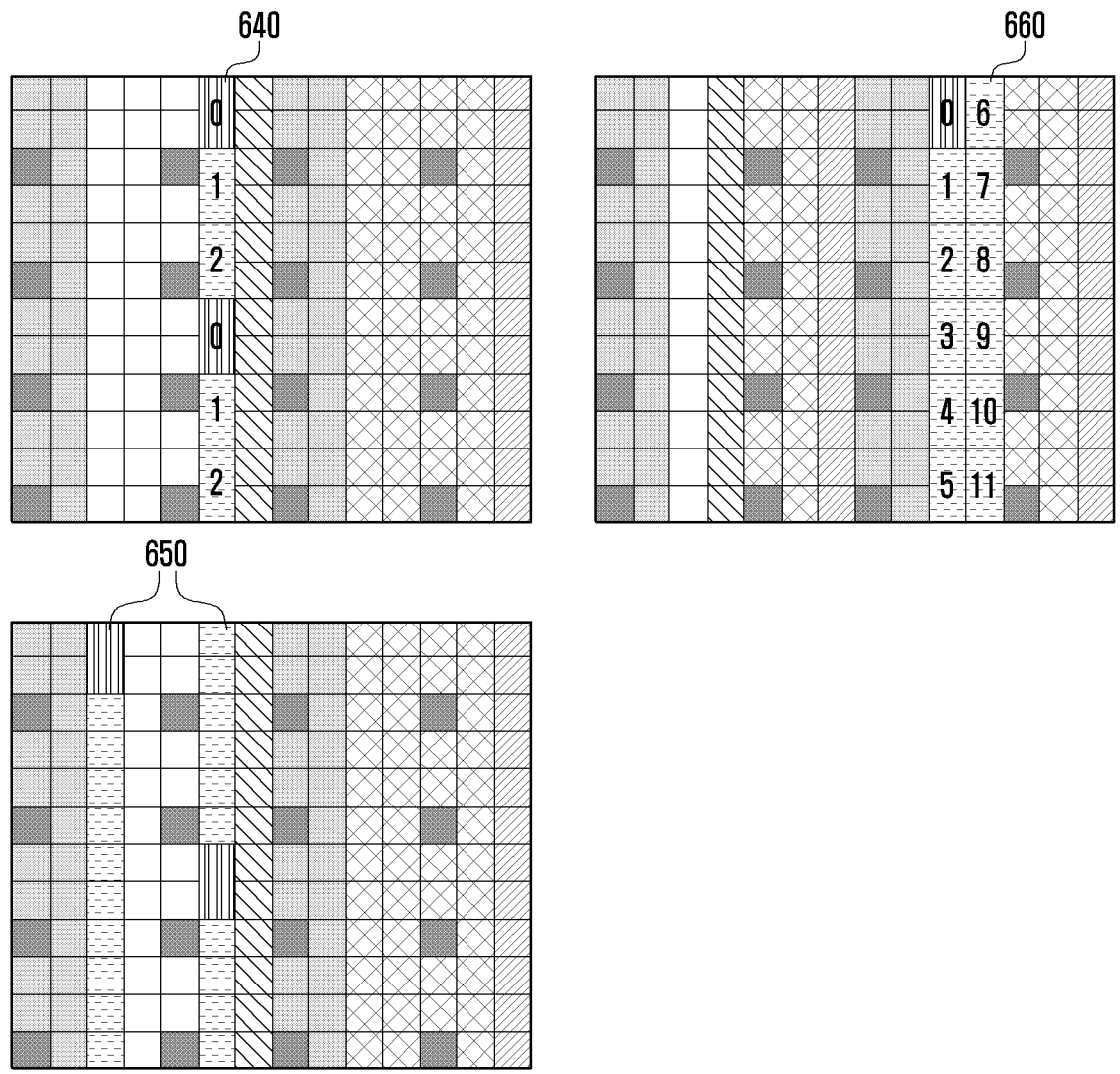

FIGS. 6A and 6B (hereinafter, referred to as FIG. 6) are diagrams illustrating other examples of a detailed RE pattern of a level-1 CSI-RS for time and frequency synchronization. Each example of FIG. 6 shows the RE pattern of each piece of signal based on one PRB in the 5G communication system. At this time, it is assumed that one PRB is composed of 12 subcarriers and 14 OFDM symbols. In the example of FIG. 6, considering "d" whether the SS block is transmitted in multiple (e.g., two) consecutive slots or minislots" among the above-described elements, the level-1 CSI-RS for time and frequency synchronization is transmitted in a level-1 CSI-RS resource pool located in the 10th and 11th OFDM symbols. In each pattern of FIG. 6, the numbers in the RE represent the port or resource index of the level-1 CSI-RS, and the terminal estimates a channel in the REs to which the CSI-RS of the same port is transmitted and performs time and frequency synchronization with the received signal.

In a pattern 600, a CSI-RS corresponding to one CSI-RS port is transmitted from REs located at different time and frequency resources, so that time and frequency synchronization can be performed only by CSI-RS, and up to six CSI-RS ports in on PRB can be configured and the CSI-RS can be transmitted accordingly. The pattern 600 is advantageous in that the interval between CSI-RS REs is constant and the structure of the receiver is simplified. Similar to the pattern 600, the pattern 610 is a pattern that can be configured up to four level-1 CSI-RS ports considering the pattern of the LTE-A CSI-RS although the CSI-RS corresponding to one port is transmitted from one RE.

In a pattern 620, a CSI-RS corresponding to one CSI-RS port is spread and transmitted through the OCC applied to two adjacent REs on the time axis. This is to facilitate coexistence with the LTE-A CSI-RS. In the pattern 620, up to twelve level-1 CSI-RS resources can be operated, where each resource can have up to two CSI-RS ports. In the case of the pattern 620, since the CSI-RS of each port is transmitted from one resource per PRB, it is difficult to perform the time synchronization only through the level-1 CSI-RS, and the time and frequency synchronization is performed in combination with the signals of the SS block.

Even in the example of FIG. 6, the level-1 CSI-RS composed of up to eight REs can be considered in consideration of a limited payload through the MIB, where the resource pool of the level-1 CSI-RS is the same as the example of the pattern 630. An example of detailed CSI-RS port operation in the pattern 630 is similar to the description in FIG. 5, and thus will not be described here.

In patterns 640 and 650, the SS blocks of different structures are assumed. As to the SS blocks of the patterns 640 and 650, since a PSS is transmitted in a first slot and an SSS and a PBCH are transmitted in a second slot, a spare RE exists in the first slot in a subframe at which the SS block is transmitted. Accordingly, the level-1 CSI-RS can be transmitted in some of the subcarriers of one OFDM symbol as in the pattern 640 by utilizing this spare space, or transmitted in some of the subcarriers of two OFDM symbols as in the pattern 650. As described in the above examples, in the case of the pattern 640, the level-1 CSI-RS and the SS block signals are used together for time and frequency synchronization. In the case of the pattern 650, the level-1 CSI-RS can be used independently for time and frequency synchronization.

Similar to the pattern 640, in a pattern 660, the CSI-RS according to one port is transmitted from two REs and the CSI-RS of each port is transmitted in one resource per PRB. In this case, it is difficult to perform time synchronization only through the level-1 CSI-RS and to perform time and frequency synchronization in combination of the signals of the SS block, thereby configuring up to 12 CSI-RSs.

Figure 7:
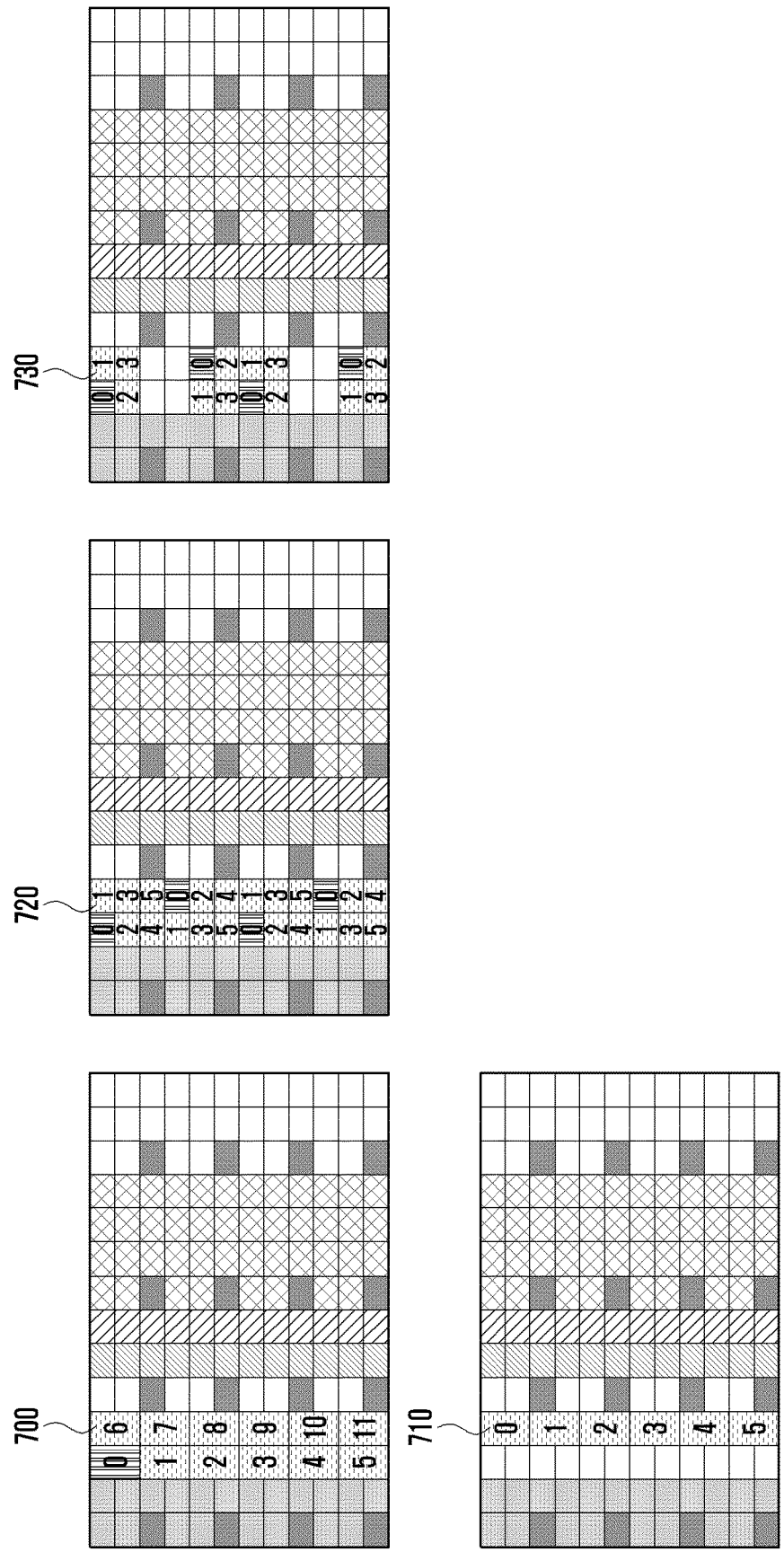
FIG. 7 is a diagram illustrating another example of a detailed RE pattern of a level-1 CSI-RS for time and frequency synchronization.

FIG. 7 is a diagram illustrating another example of a detailed RE pattern of a level-1 CSI-RS for time and frequency synchronization. Each example of FIG. 7 shows the RE pattern of each piece of signal based on one PRB in the 5G communication system. At this time, it is assumed that one PRB is composed of 12 subcarriers and 14 OFDM symbols. In the example of FIG. 7, considering "c" whether the SS block is transmitted in one slot or minislot" among the above-descried elements, the level-1 CSI-RS for time and frequency synchronization is transmitted in a level-1 CSI-RS resource pool located in the third and fourth OFDM symbols. The numbers in the RE in each pattern of FIG. 7 represent the port or resource index of the level-1 CSI-RS, and the terminal estimates a channel in the REs to which the CSI-RS of the same port is transmitted and performs time and frequency synchronization with the received signal.

In pattern 700, a CSI-RS according to one CSI-RS port is spread and transmitted through the OCC at adjacent REs on two frequency axes. This is to allow the level-1 CSI-RS for time and frequency synchronization to be easily multiplexed with other DMRS or CSI-RSs. The pattern 700 supports the configuration of up to 12 CSI-RSs, and some of them may be omitted depending on the MIB payload. The pattern 710 is similar to the pattern 700, but is a pattern that supports the configuration of up to six CSI-RSs in the fourth OFDM symbol, considering that a physical downlink control channel (PDCCH) can be extended up to the third OFDM symbol.

Since the patterns 720 and 730 can refer to the descriptions of the patterns 600 and 610, a detailed description thereof will be omitted.

Figure 8:
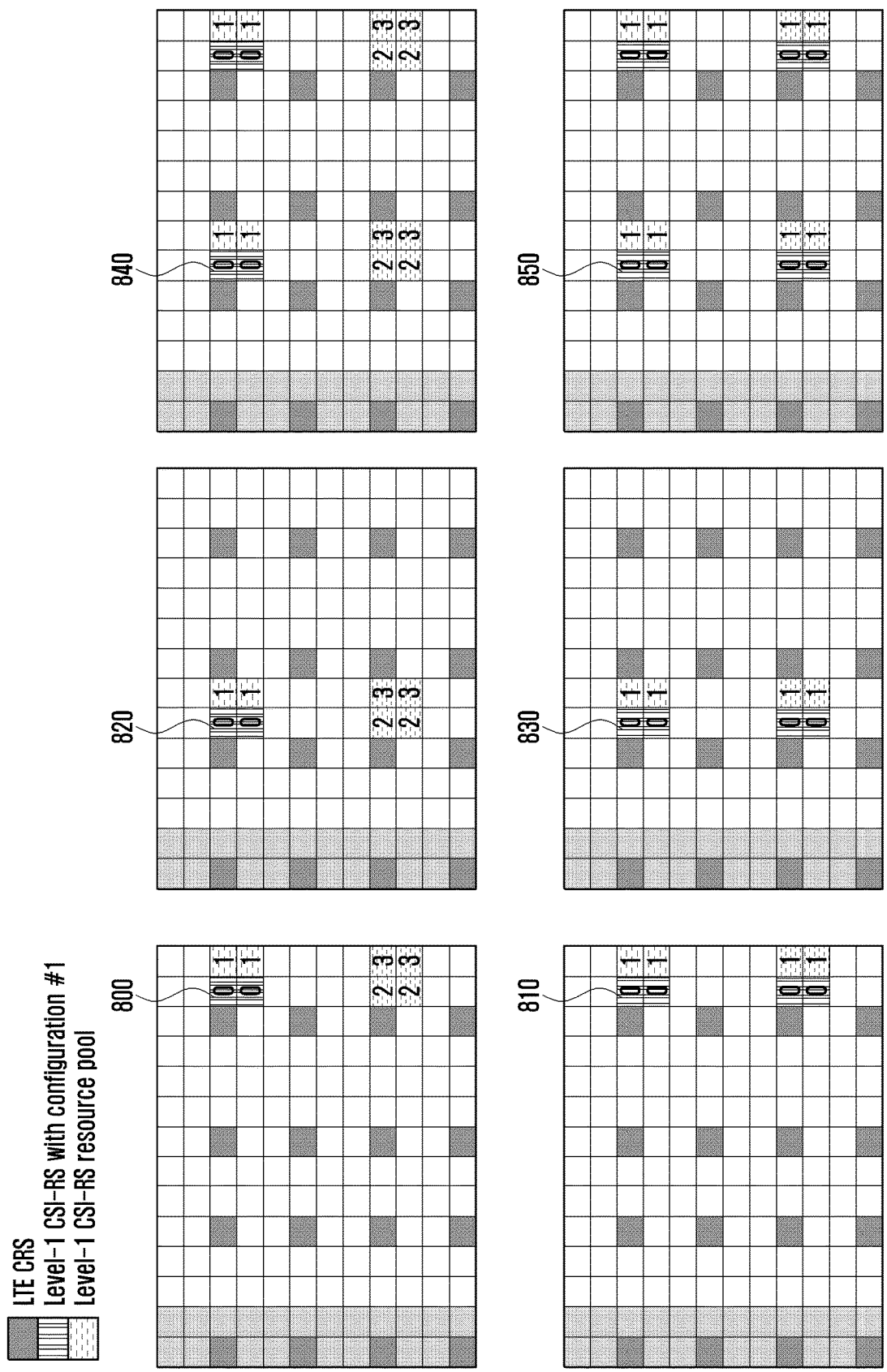
FIG. 8 is a diagram illustrating another example of a detailed RE pattern of a level-1 CSI-RS for time/frequency synchronization.

FIG. 8 is a diagram illustrating another example of a detailed RE pattern of a level-1 CSI-RS for time/frequency synchronization. Each example of FIG. 8 shows the RE pattern of each piece of signal based on one PRB in the 5G communication system. At this time, it is assumed that one PRB is composed of 12 subcarriers and 14 OFDM symbols. In the example of FIG. 8, adjacent REs on two frequency axes form one basic pattern as described in the first embodiment. At this time, transmission can be performed without applying the OCC to each RE. The numbers in the RE in each pattern in FIG. 8 represent the port or resource index of the level-1 CSI-RS. The terminal estimates a channel in the REs to which the CSI-RS of the same port is transmitted, and performs time and frequency synchronization with the received signal. The patterns 800, 820, and 840 may support the configuration of up to four CSI-RSs, and the patterns 810, 830, and 850 may support the configuration of up to two CSI-RSs. Some of the patterns may be omitted depending on the MIB payload.

Figure 9:
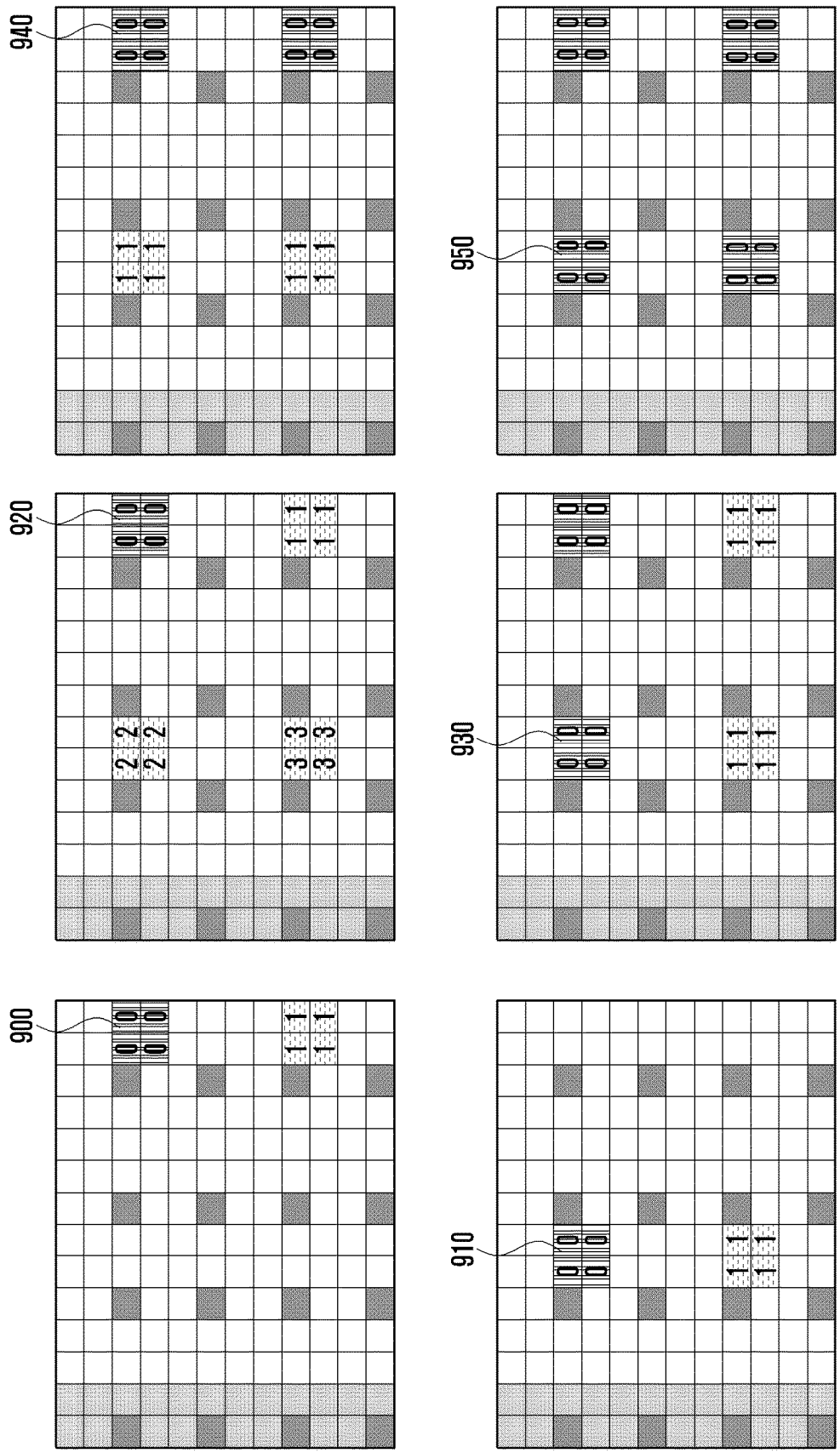
FIG. 9 is a diagram illustrating another example of a detailed RE pattern of a level-1 CSI-RS for time/frequency synchronization.

FIG. 9 is a diagram illustrating another example of a detailed RE pattern of a level-1 CSI-RS for time/frequency synchronization. Each example of FIG. 9 shows the RE pattern of each signal based on one PRB in the 5G communication system. At this time, it is assumed that one PRB is composed of 12 subcarriers and 14 OFDM symbols. In the example of FIG. 9, adjacent REs on four frequency and time axes form one basic pattern as described in the first embodiment. At this time, transmission can be performed without applying the OCC to each RE. The numbers in the RE in each pattern in FIG. 9 represent the port or resource index of the level-1 CSI-RS. The terminal estimates a channel in the REs to which the CSI-RS of the same port is transmitted, and performs time and frequency synchronization with the received signal. A pattern 920 may support the configuration of up to four CSI-RSs, and patterns 900, 910, 930, and 940 may support the configuration of up to two CSI-RSs. A pattern 950 may support the configuration of only one CSI-RS. Some of the patterns may be omitted depending on the MIB payload.

Figure 10:
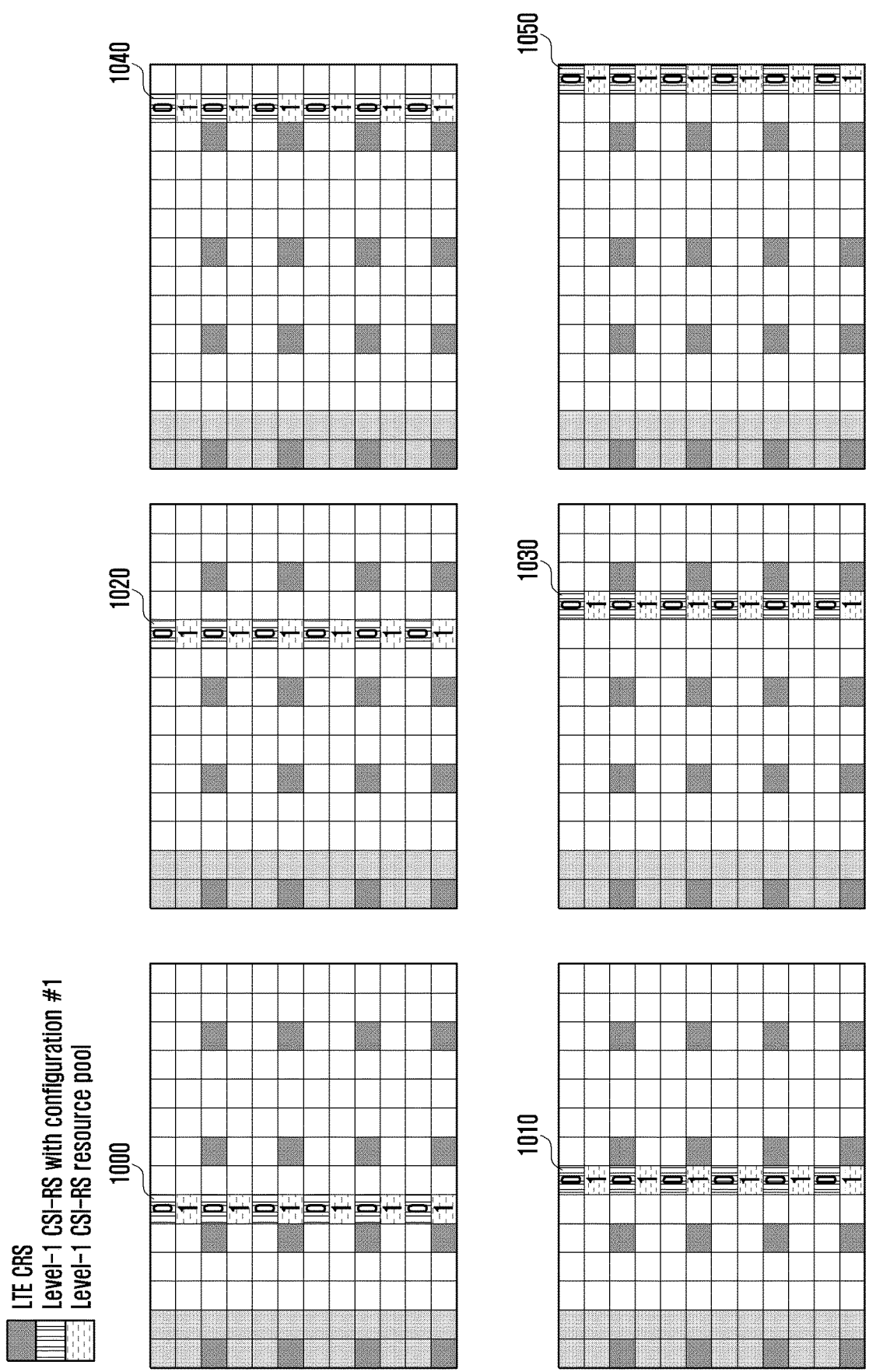
FIG. 10 is a diagram illustrating another example of a detailed RE pattern of a level-1 CSI-RS for time/frequency synchronization.

FIG. 10 is a diagram illustrating another example of a detailed RE pattern of a level-1 CSI-RS for time/frequency synchronization. Each example of FIG. 10 shows the RE pattern of each signal based on one PRB in the 5G communication system. At this time, it is assumed that one PRB is composed of 12 subcarriers and 14 OFDM symbols. The example of FIG. 10 shows a basic pattern composed of a plurality of even-numbered or odd-numbered REs, as described in the first embodiment. At this time, transmission can be performed without applying the OCC to each RE. The numbers in the RE in each pattern in FIG. 10 represent the port or resource index of the level-1 CSI-RS. The terminal estimates a channel in the REs to which the CSI-RS of the same port is transmitted, and performs time and frequency synchronization with the received signal. Patterns 1000, 1010, 1020, 1030, 1040, and 1050 may support the configuration of up to two CSI-RSs. In the case of the patterns 1000 and 1010, since the data is transmitted immediately after a front loaded DMRS (DMRS) located in front of the patterns 1000 and 1010, it is possible to support fast time/frequency tracking. In the patterns 1020 and 1030, LTE terminals can configure a zero-power (ZP) CSI-RS in consideration of a corresponding pattern. In the case of the patterns 1040 and 1050, there is no risk of collision with LTE PSS, SSS, and PBCH. Depending on the MIB payload, some of the patterns may be omitted.

Figure 11:
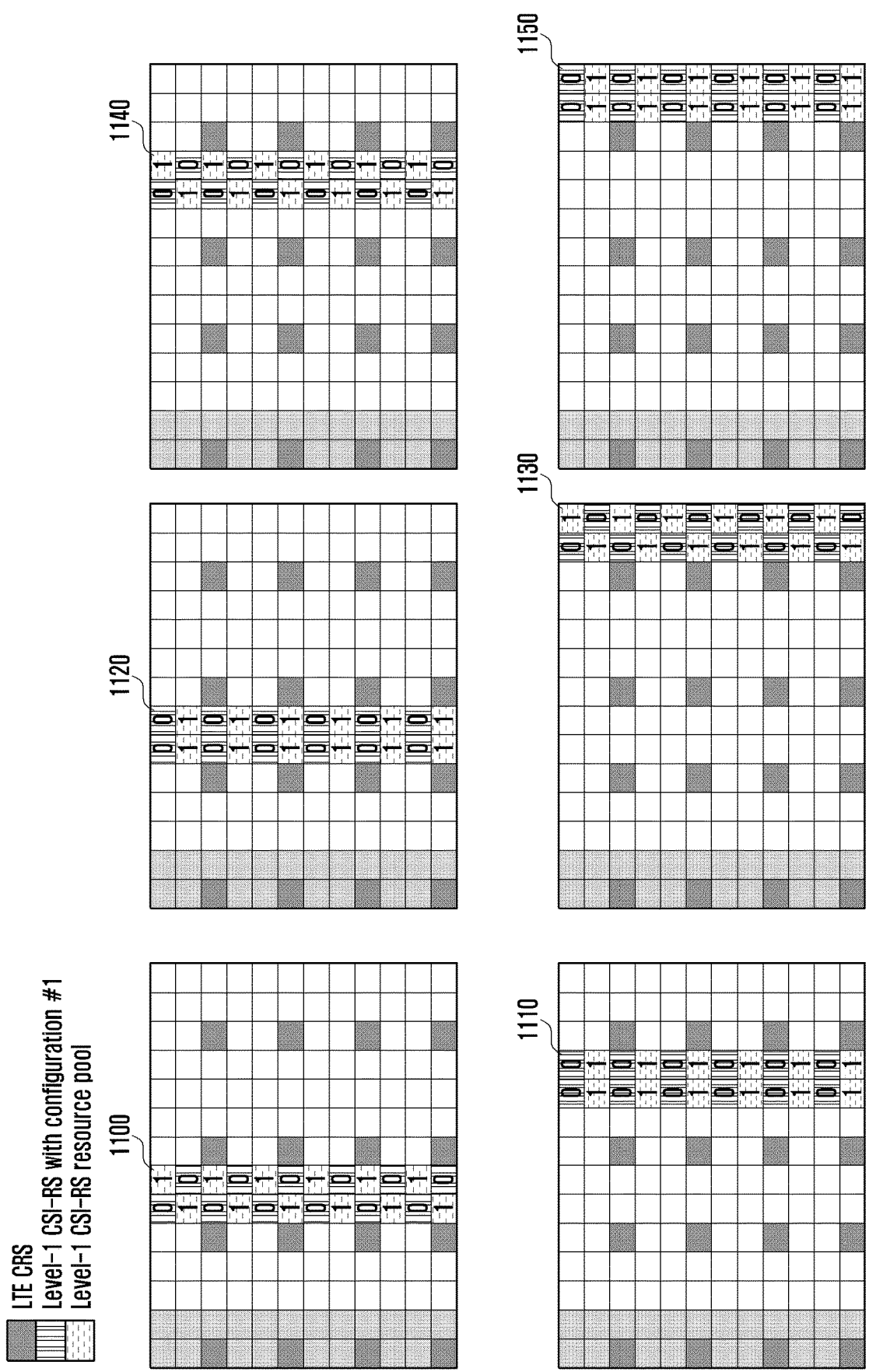
FIG. 11 is a diagram illustrating examples in which level-1 CSI-RSs are transmitted in two adjacent OFDM symbols.

FIG. 11 is a diagram illustrating examples in which level-1 CSI-RSs are transmitted in two adjacent OFDM symbols, as a modification of FIG. 10. Features and advantages of each pattern are similar to those of FIG. 10, and therefore a detailed description thereof will be omitted.

Third Embodiment

Figure 12:
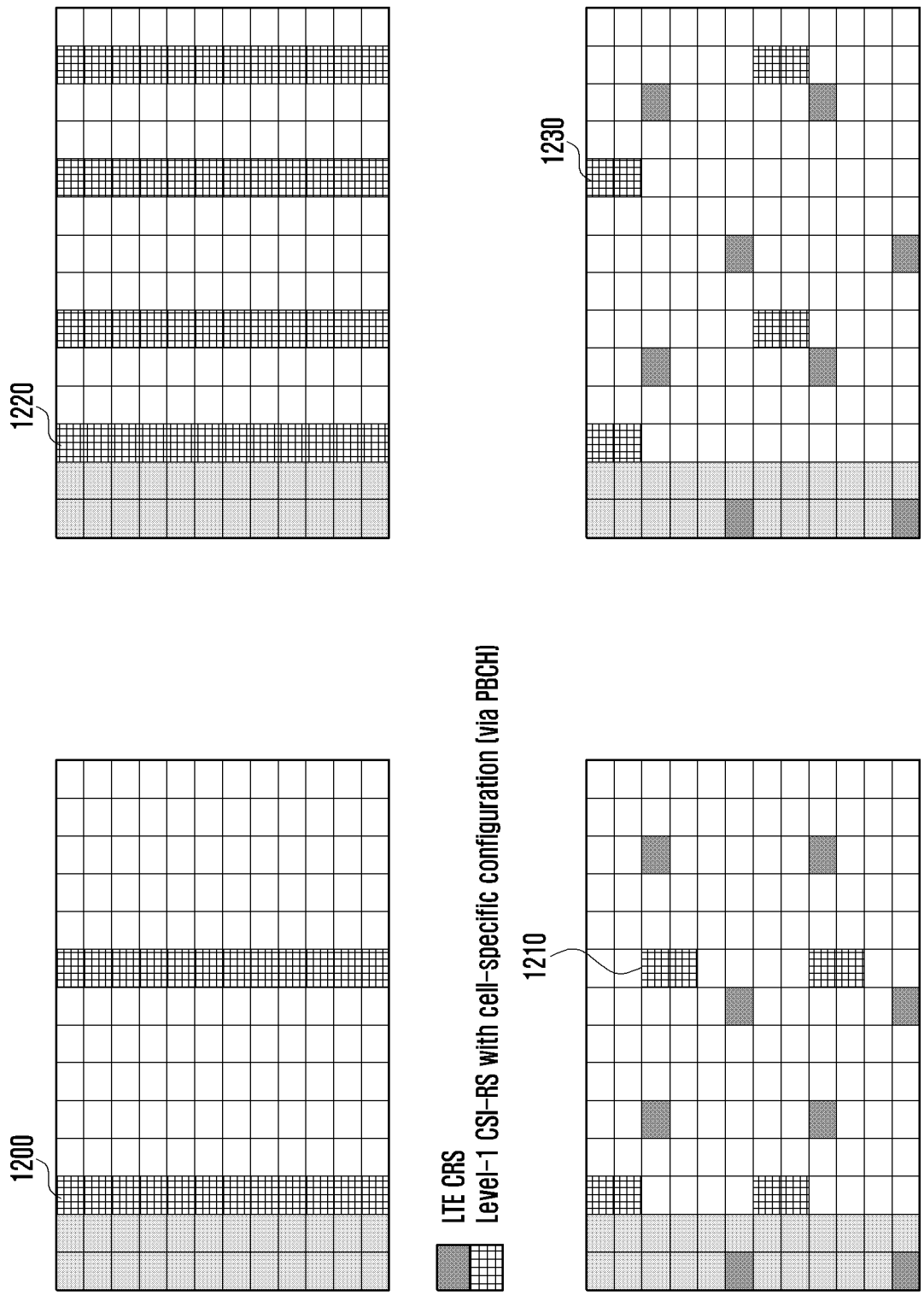
FIG. 12 is a diagram illustrating an example in which a DMRS is used as a reference signal for time and frequency estimation.

In the third embodiment of the disclosure, an example of a case in which other reference signals such as a physical downlink shared channel (PDSCH) DMRS, PDCCH DMRS, PBCH DMRS, and the like other than the CSI-RS are used as reference signals for time and frequency estimation will be described. FIG. 12 is a diagram illustrating an example in which a DMRS is used as a reference signal for time and frequency estimation. In FIG. 12, if the PDSCH DMRS pattern is equal to the RE shown at 1200, the terminal may ensure to assume that a tracking reference signal is transmitted to some of the PDSCH patterns in a slot or a subframe configured to receive the reference signal for time and frequency estimation. This is because a reference signal RE density for time and frequency estimation is smaller than a reference signal RE density required for data demodulation. For example, the terminal is able to receive the tracking reference signal at REs of a pattern 1210 on the basis of the pattern of 1200. As another example, if the PDSCH DMRS pattern is equal to 1220, the terminal is able to receive a tracking reference signal on the basis of the REs of 1230 in a slot or subframe for time and frequency synchronization.

Fourth Embodiment

The fourth embodiment of the disclosure proposes a method of triggering time and frequency synchronization or adjusting the accuracy thereof according to environments such as terminal request, data traffic condition, and the like.

In the above examples, methods of informing reference signal configuration information for time and frequency synchronization through an MIB or SIB have been described. For example, in the second embodiment, examples in which the level-1 CSI-RS is configured through the MIB and time and frequency synchronization are performed on the basis of the level-1 CSI-RS have been described. In this case, as long as the MIB configuration is not changed, the reference signal is always transmitted in a predetermined resource, which makes it difficult to secure forward compatibility.

As one method for solving this, the terminal can request the base station to transmit a tracking reference signal (cell-specific level-1 CSI-RS in the second embodiment). For example, the terminal may report to the base station whether the tracking reference signal is required for accurate time and frequency synchronization using a bit in a scheduling request (SR) or a random access channel (RACH) response. As another example, a request using an higher layer such as RRC or MAC CE is possible.

In another example, the terminal may report to the base station what tracking reference signal configuration information is required for the base station. For example, the terminal may report, to the base station, information (or some of them) such as the number of ports of a tracking reference signal, time and/or frequency RE density, pattern, transmission period, and the like, which are suitable for various environments such as channel condition, carrier frequency, antenna array shape, and the like. On the basis of this, the base station can adjust the burden required for transmitting the tracking reference signal. The required configuration information may be reported through an higher layer such as RRC, MAC CE, and the like.

Figure 13:
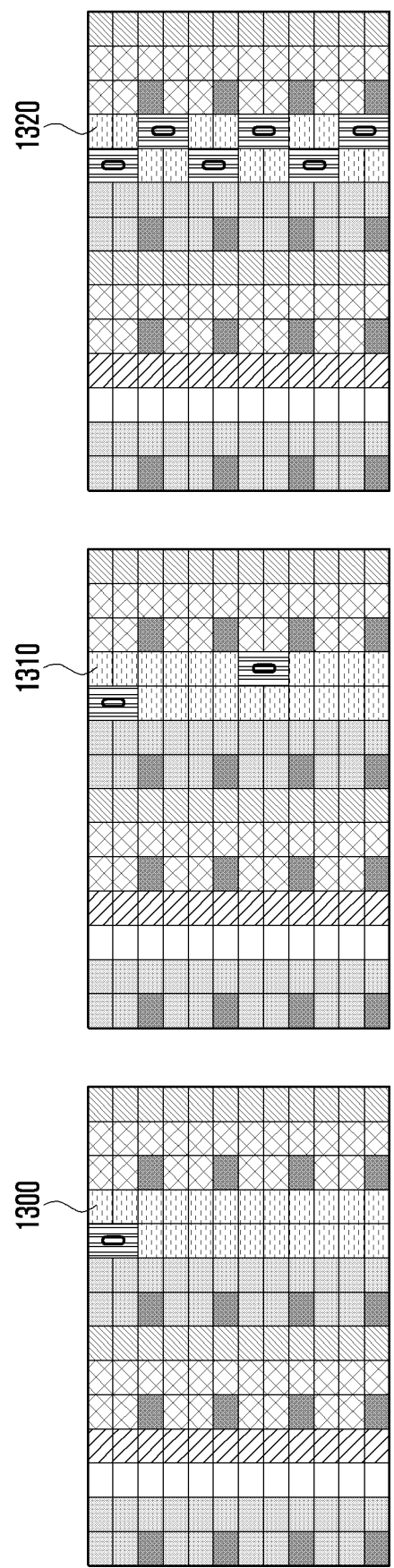
FIG. 13 is a diagram illustrating an example of tracking reference signal pattern adjustment.

FIG. 13 is a diagram illustrating an example of tracking reference signal pattern adjustment. The base station may change the RE density and pattern of the tracking reference signal as shown in the patterns 1300, 1310, or 1320 of FIG. 13 on the basis of an RACH response of the terminal or a tracking reference signal requirement condition reported by the terminal. In case of the pattern 1300, since the reference signal RE density is the lowest, the pattern 1300 has the smallest burden of the transmission and can minimize the interference between the tracking reference signals by utilizing a large number of patterns. However, time and frequency synchronization performance will be the lowest. In the case of the pattern 1320, since the tracking reference signal RE density is the highest, the pattern 1320 has the largest burden of the transmission and can manage the interference between the tracking reference signals using only a small number of patterns. However, time and frequency synchronization performance will be the best.

Fifth Embodiment

If the reference signal such as CSI-RS, PBCH DMRS, or PDCCH DMRS is configured for the purpose of time and frequency tracking, the CDM applied to the corresponding reference signal is not applied (turned off) to allow the terminal to measure a phase difference for each reference signal RE. Also, the density of the reference signal can be set to 1 RE/RB/port or more, for example, {4, 6, 8} RE/RB/port, by which the phase difference can be measured on the basis of several REs within one PRB.

Figure 14A:
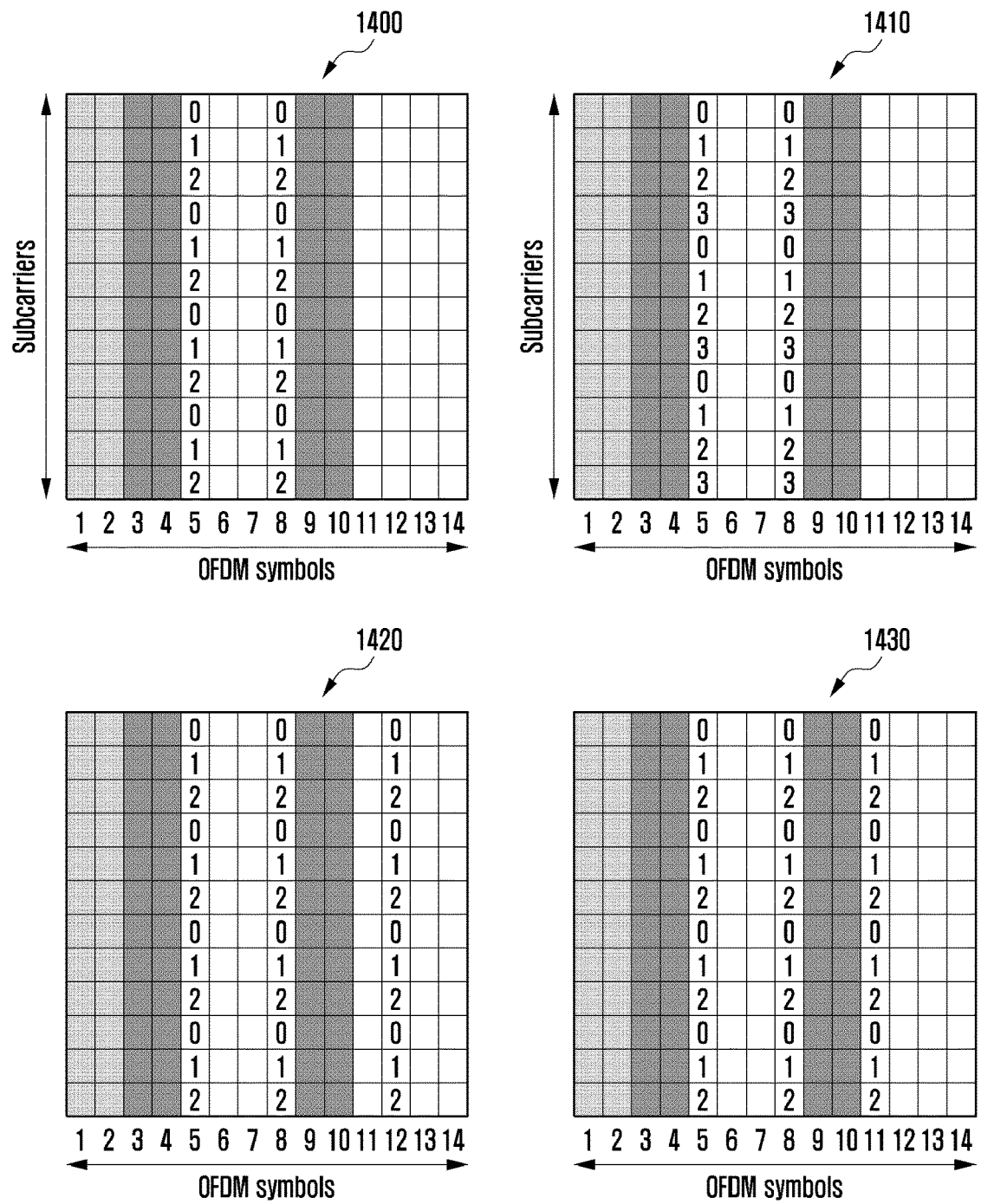
FIGS. 14A and 14B are diagrams illustrating examples of CSI-RS configuration for time and frequency tracking according to an embodiment of the disclosure.
Figure 14B:
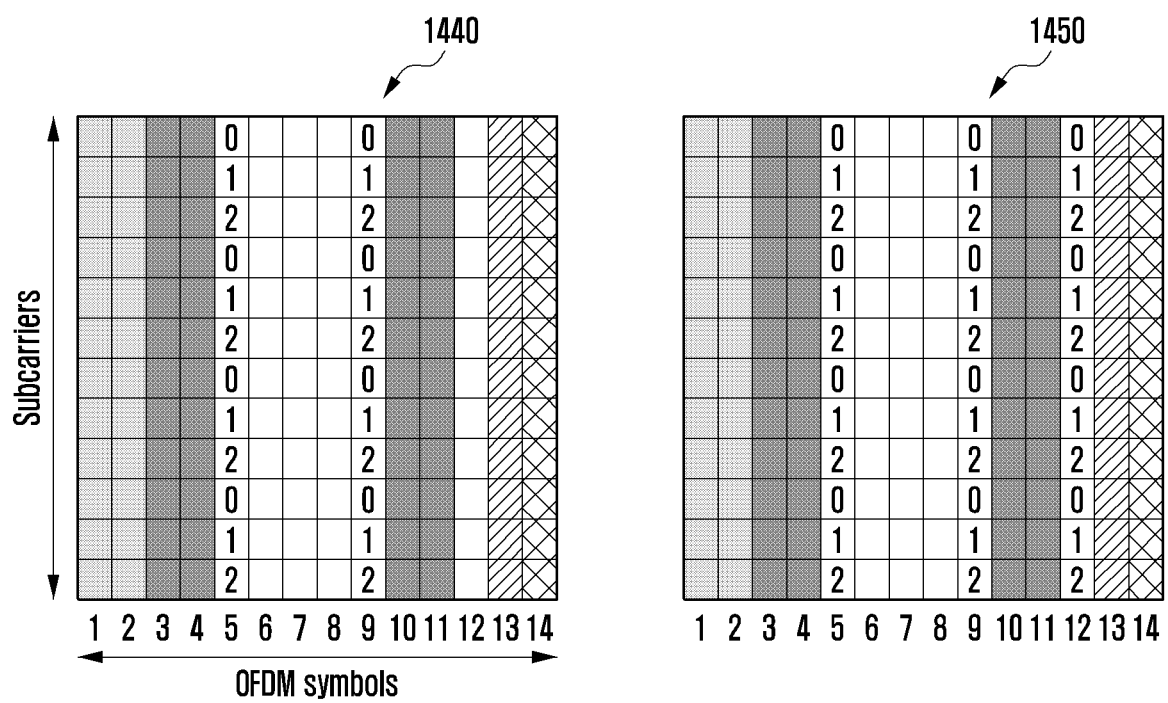

FIGS. 14A and 14B (hereinafter, referred to as FIG. 14) are diagrams illustrating examples of CSI-RS configuration for time and frequency tracking according to an embodiment of the disclosure. In FIG. 14, it is assumed that a PDCCH is transmitted to {1, 2}-th OFDM symbols, a front-loaded DMRS located before {3, 4}-th OFDM symbols is transmitted, and an additional DMRS is transmitted to {9, 10}-th or {10, 11}-th OFDM symbols. In some examples, a guard period (GP) is transmitted to a 13th OFDM symbol and a physical uplink control channel (PUCCH) or a sounding reference signal (SRS) is transmitted to a 14th OFDM symbol.

In FIG. 14, reference signals of the same port are transmitted to REs indicated by the same numerals. One reference signal resource includes at least one antenna port that is transmitted to REs indicated by {0, 1, 2, or 3} in FIG. 14.

1400 and 1410 represent CSI-RS (or tracking reference signal, TRS) RE patterns when the CSI-RS RE density is set to 8 RE/RB/port and 6 RE/RB/port for time and frequency tracking, respectively. In other words, the RS of one port is transmitted (4 RE/symbol/port) in 4 REs per OFDM symbol in case of 1400, and the RS of one port is transmitted (3 RE/symbol/port) in 3 REs per OFDM symbol in case of 1410. Although the RE density per symbol of 1400 is assumed and illustrated for convenience of description in FIGS. 14, 15 and the following examples, it is obvious that the example of 1410 in actual application can be similarly expanded. In the examples of 1400 and 1410, the TRSs are transmitted in some of OFDM symbols to which the LTE CRS is transmitted, so that the base station can minimize the interference in an appropriate combination of the patterns of LTE CRS and NR TRS or can reuse a portion of the LTE CRS as the NR TRS. This is also applied to the case of 1420.

In case of 1430, there is an advantage that a uniform interval is provided in the time domain, and reception of the reference signal in the terminal is facilitated. If the position of the additional DMRS is fixed as in cases of 1440 or 1450, the position of the TRS can also be adjusted accordingly. 1440 is a case where the reference signal RE density per TRS port is 8 RE/RB/port, and 1450 is a case where the reference signal RE density per TRS port is 12 RE/RB/port.

Sixth Embodiment

Figure 15A:
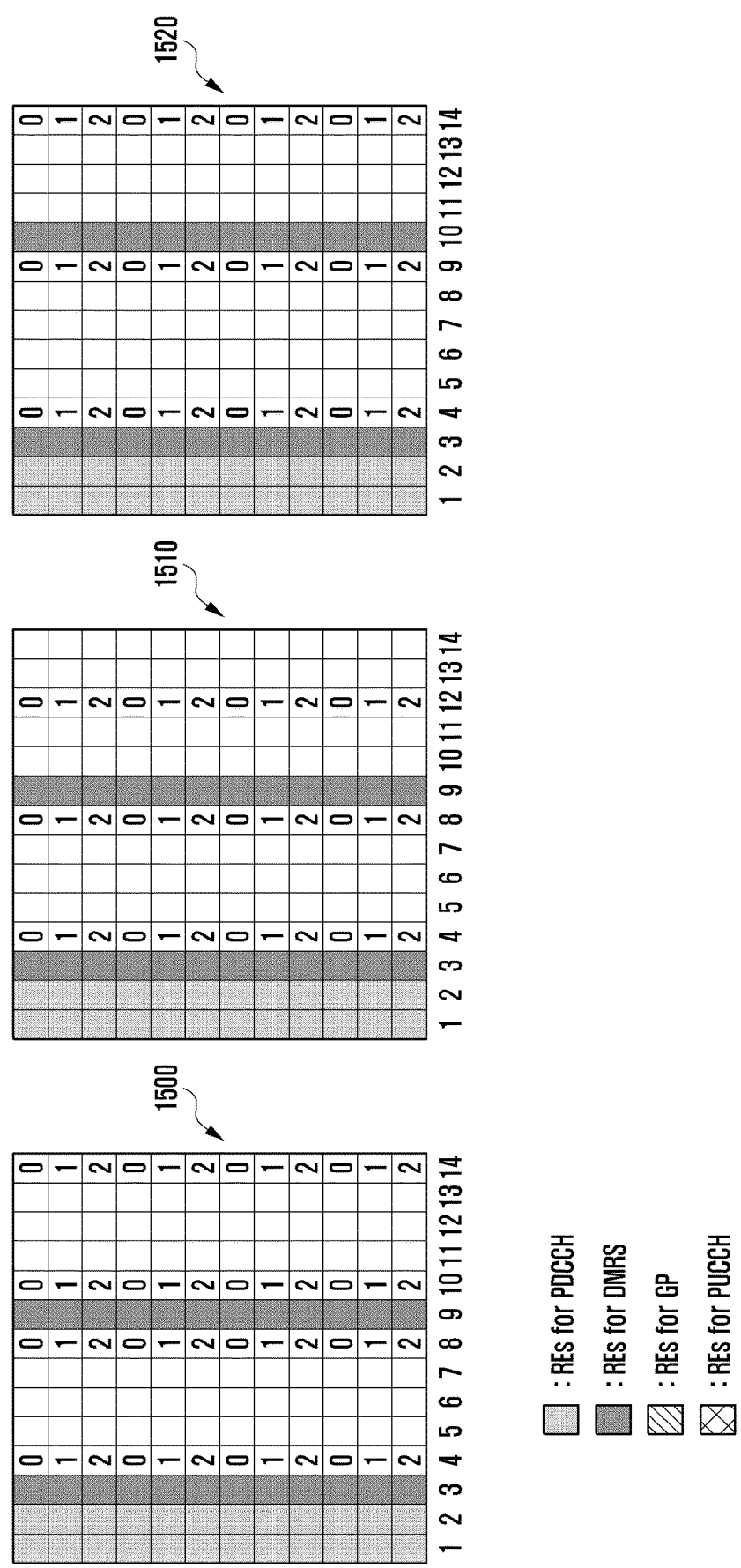
FIGS. 15A, 15B, and 15C are diagrams illustrating examples of CSI-RS configuration for time and frequency tracking according to an embodiment of the disclosure.
Figure 15B:
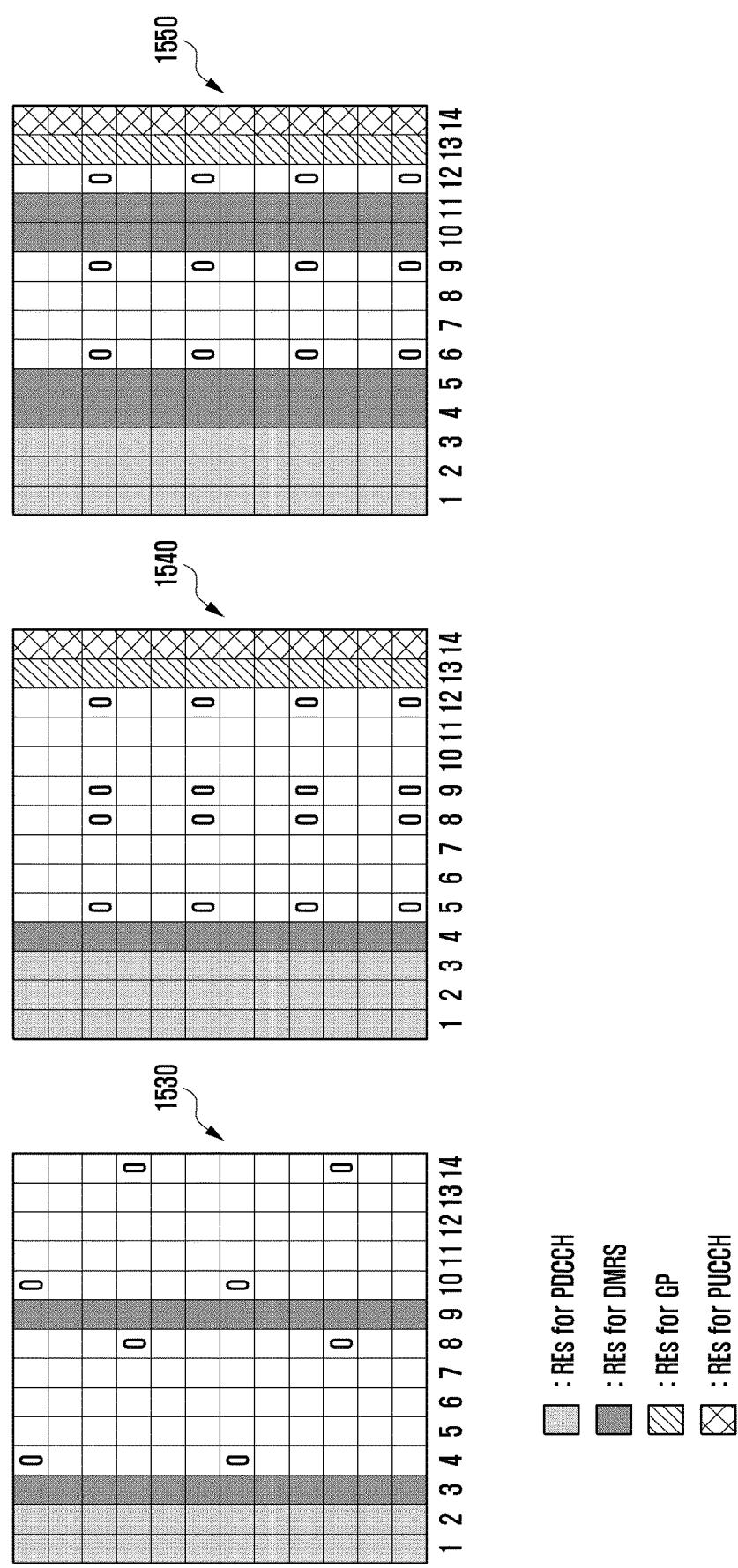
Figure 15C:
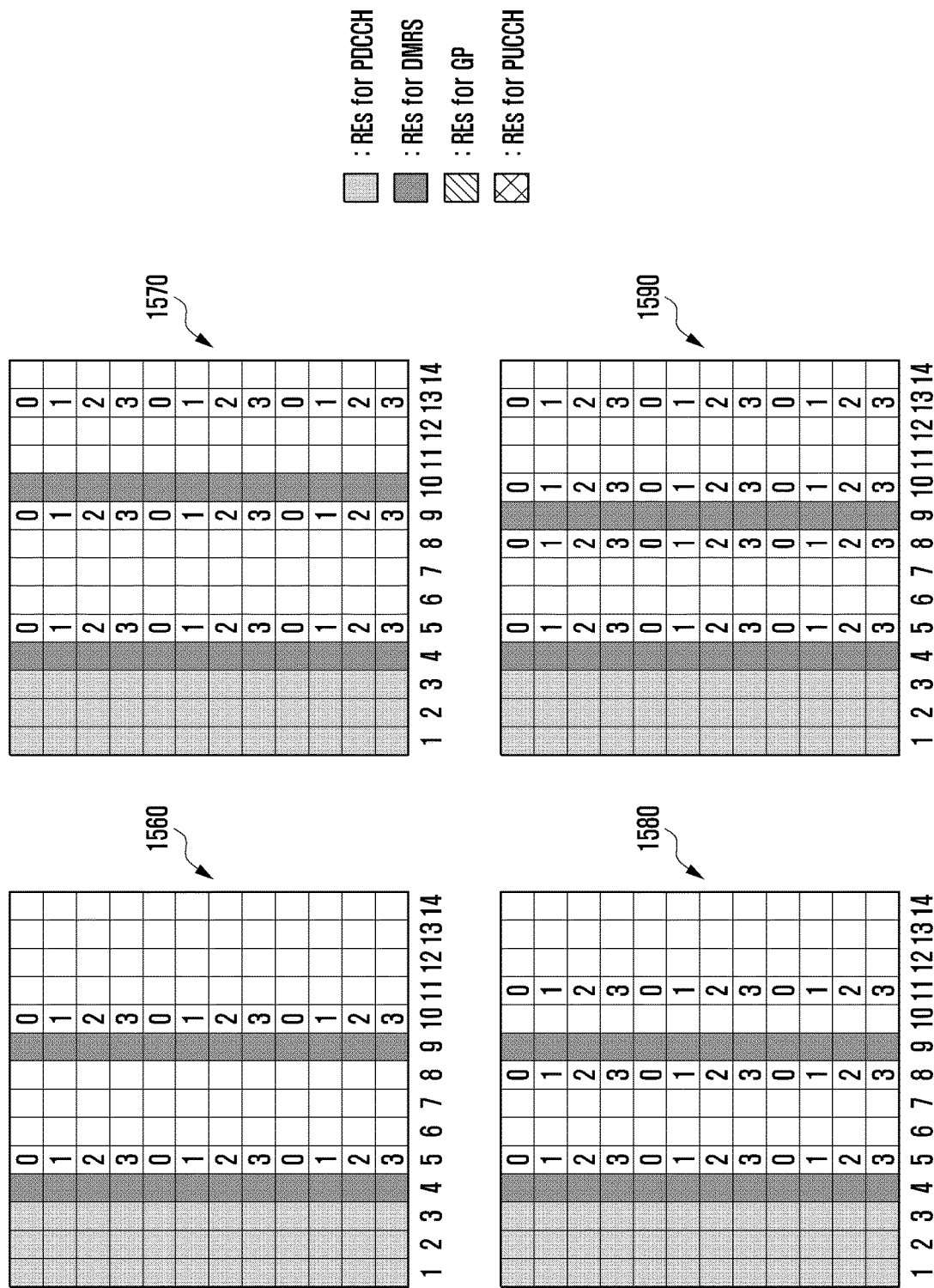

In this embodiment, a method of adjusting the reference signal overhead by applying the configuration restriction on the DMRS pattern depending on the presence and absence of the SS block and the TRS will be described. FIGS. 15A, 15B, and 15C (Hereinafter, referred to as FIG. 15) are diagrams illustrating examples of CSI-RS configuration for time and frequency tracking according to an embodiment of the disclosure. In FIG. 15, it is assumed that a PDCCH is transmitted to {1, 2}-th or {1, 2, 3}-th OFDM symbols, a DMRS located in front of {3 or 4}-th OFDM symbols is transmitted, and an additional DMRS is transmitted to a {9 or 10}-th OFDM symbol. In some examples, a GP can be transmitted to the 13th OFDM symbol and a PUCCH or an SRS can be transmitted to the 14th OFDM symbol.

In FIG. 15, the reference signals of the same port are transmitted to the REs indicated by the same numerals. One reference signal resource includes at least one antenna port that is transmitted to the REs denoted by {0, 1, 2, or 3} in FIG. 15.

In a general slot, the base station is able to use two OFDM symbols for the preceding DMRS to be transmitted following a PDCCH OFDM symbol and one or more OFDM symbols for an additional DMRS for high UE mobility support of the terminal. Here, in the worst case, when 3 symbols for PDCCH, 4 symbols for DMRS, and additional OFDM symbols for SS block, CSI-RS, and TRS transmission are used, resources of 50% or more may be used for the transmission of control information and reference signal. This may result in periodic throughput degradation to the terminal, so it is possible to limit the number of PDCCH OFDM symbols or the number of DMRS OFDM symbols in a slot where the SS block is transmitted or the TRS is transmitted.

For example, the number of PDCCH OFDM symbols can be limited to a maximum of 2 in slots in which the SS block or the TRS is transmitted, such as 1500, 1510, 1520, and 1530, and each one OFDM symbol can be limited to be used for the preceding DMRS and the additional DMRS. At this time, the maximum number of MIMO layers that can be allocated in the corresponding slot or the number of UEs for multi-user transmission is limited according to the reduced number of DMRS OFDM symbols. In this case, the TRS can be transmitted in the second OFDM symbol for the preceding DMRS or in some OFDM symbols for the additional DMRS.

1500 shows a pattern for improving time and frequency tracking performance by securing two pairs of TRS patterns having four OFDM symbol intervals in one slot. 1510 and 1520 show TRS patterns having the same time intervals of 4 OFDM symbol intervals and 5 OFDM symbol intervals, respectively, considering the terminal complexity. In each of the examples, each reference signal RE has an RE pattern that is transmitted in the same subcarrier in different OFDM symbols, i.e., has a rectangular RE pattern. However, the reference pattern RE can be transmitted by applying a check pattern as in the example of 1530.

1560 is a diagram showing an example in which the TRS is transmitted in the second OFDM symbol of the preceding DMRS (the fifth OFDM symbol in a slot reference) and the second OFDM symbol (the tenth OFDM symbol in a slot reference) of the additional DMRS. It is assumed that up to three PDCCH OFDM symbols are transmitted in 1560. However, if a maximum of two PDCCH OFDM symbols are used in a similar manner to the above examples, the position of the OFDM symbol for TRS transmission can be changed accordingly. 1570 and 1580 show TRS patterns having the same time interval of 4 OFDM symbol intervals and 3 OFDM symbol intervals in consideration of terminal complexity when a maximum of 3 PDCCH OFDM symbols are transmitted. If high accuracy Doppler parameter estimation is required for high mobility UEs, the TRS pattern in 1590 can be considered.

Seventh Embodiment

As another method for mitigating the TRS transmission overhead, port sharing with the PBCH DMRS can be considered. For example, some of the TRS patterns in one slot may have the same DMRS and RE positions for PBCH decoding.

For example, assuming that the PSS and the SSS are transmitted to the sixth and seventh OFDM symbols and the PBCH is transmitted to the eighth and ninth OFDM symbols, respectively, in 1540 of FIG. 15, the PBCH DMRS can be transmitted to the REs existing in the eighth and ninth OFDM symbols of the TRs REs indicated by "0" in 1540. If the base station is configured to share the PBCH DMRS RE and the TRS RE, beams applied to the PBCH DMRS port and the TRS port can be kept the same in order to facilitate time and frequency tracking of the terminal, and the terminal can estimate a channel by assuming a QCL between the two ports.

Figure 16:
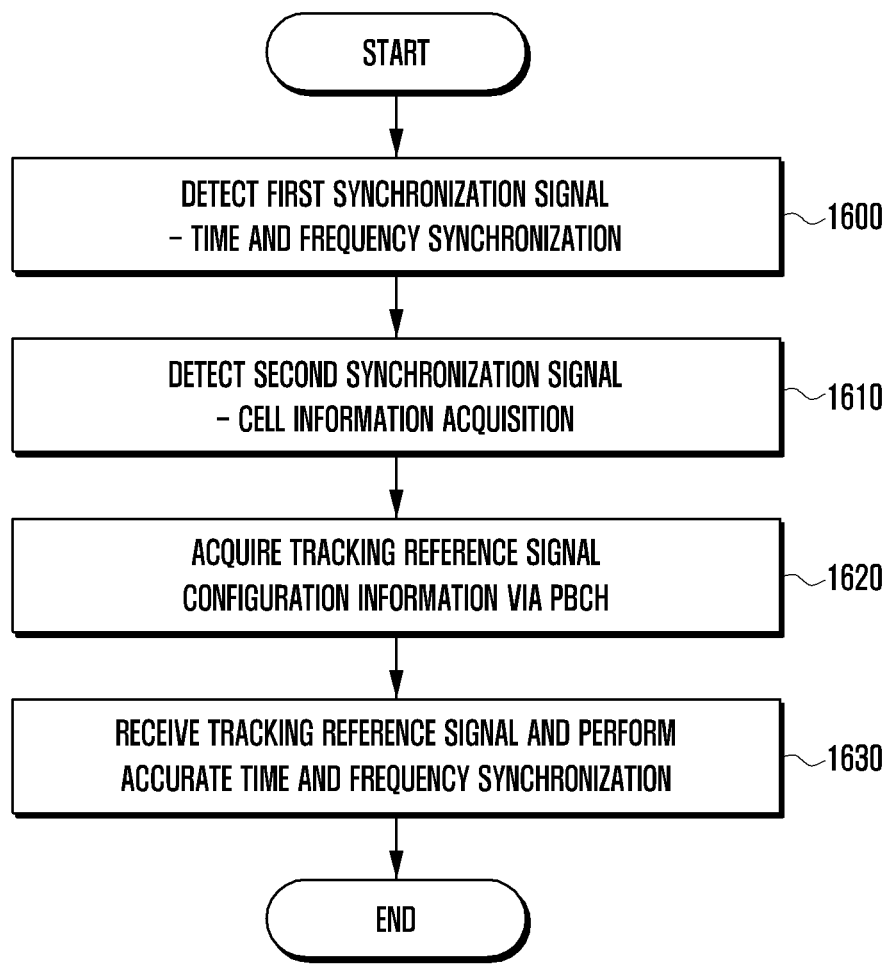
FIG. 16 is a flowchart illustrating a procedure in which a terminal performs time and frequency synchronization for data signal demodulation on the basis of a tracking reference signal in a 5G communication system considered in the disclosure.

FIG. 16 is a flowchart illustrating a procedure in which a terminal performs and completes time and frequency synchronization for data signal demodulation on the basis of a tracking reference signal (e.g., the level-1 CSI-RS in the second embodiment) in a 5G communication system considered in the disclosure.

In FIG. 16, the process in which the terminal completes time and frequency synchronization for data signal demodulation includes detecting a first synchronization signal in operation 1600, detecting a second synchronization signal in operation 1610, acquiring synchronization block transmission timing and tracking reference signal configuration information through and broadcast channel demodulation in operation 1620, and performing accurate time and frequency synchronization in operation 1630.

The detecting of the first synchronization signal in operation 1600 is as follows. The terminal detects the first synchronization signal, thereby performing time synchronization on an OFDM symbol boundary, and estimating approximate frequency offset according to the implementation. The terminal detects the second synchronization signal according to a time and frequency synchronization estimation value estimated in operation 1610. In operation 1610, the terminal detects the cell number of the base station to which the terminal wants to connect by using the second synchronization signal. Next, in operation 1620, the terminal acquires the tracking reference signal configuration information through broadcast channel demodulation. When the base station transmits tracking reference signal-related information to the broadcast channel, the terminal may demodulate or decode the broadcast channel to obtain position information on REs to which the tracking reference signal is transmitted. In operation 1630, the terminal may improve the time and frequency synchronization accuracy to a level that enables data signal demodulation by using a correlation of the tracking reference signal, in a similar manner to the detection of the second synchronization signal.

Figure 17:
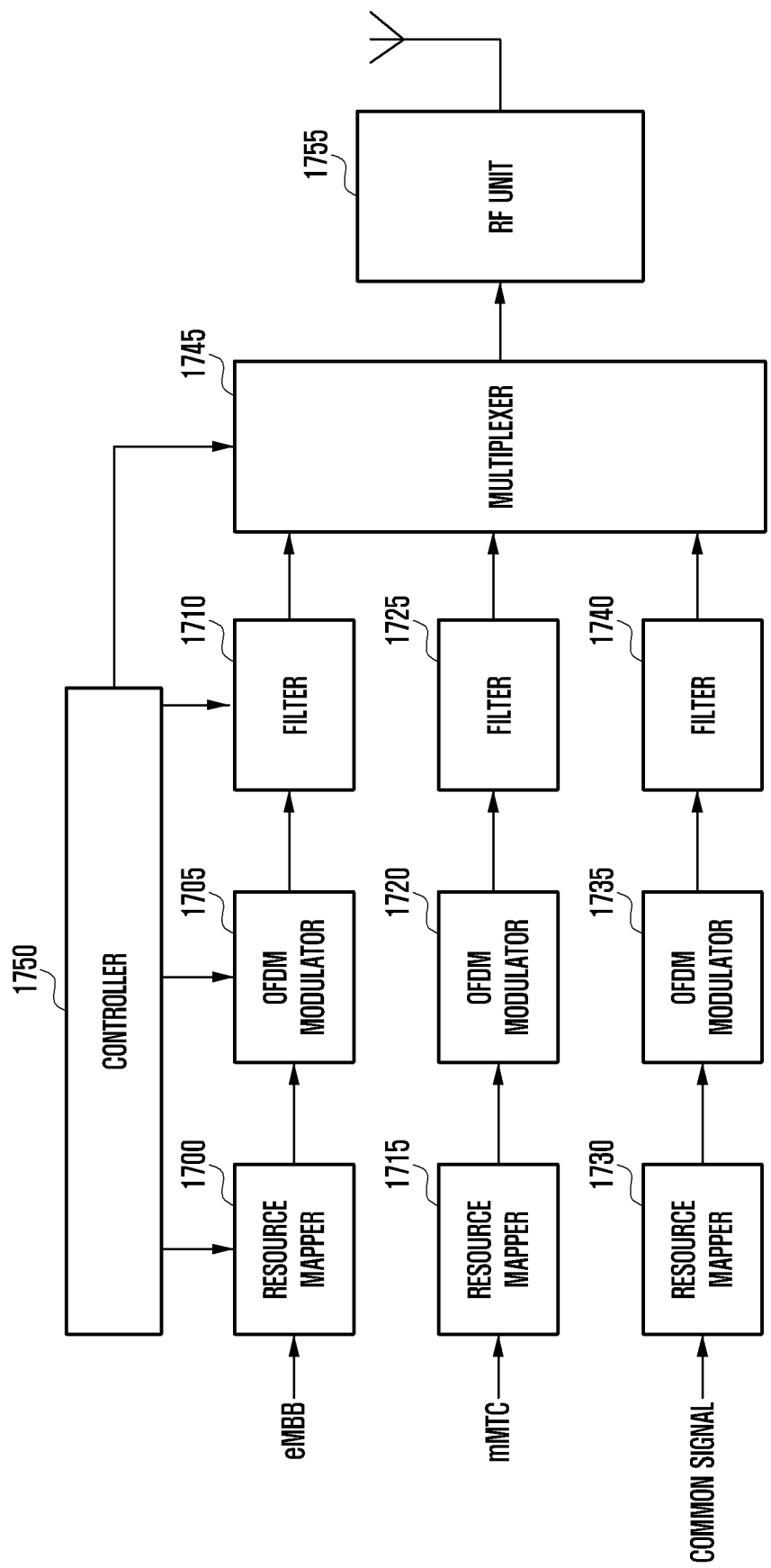
FIG. 17 is a block diagram illustrating an internal structure of a base station transmitter according to an embodiment of the disclosure.
Figure 18:
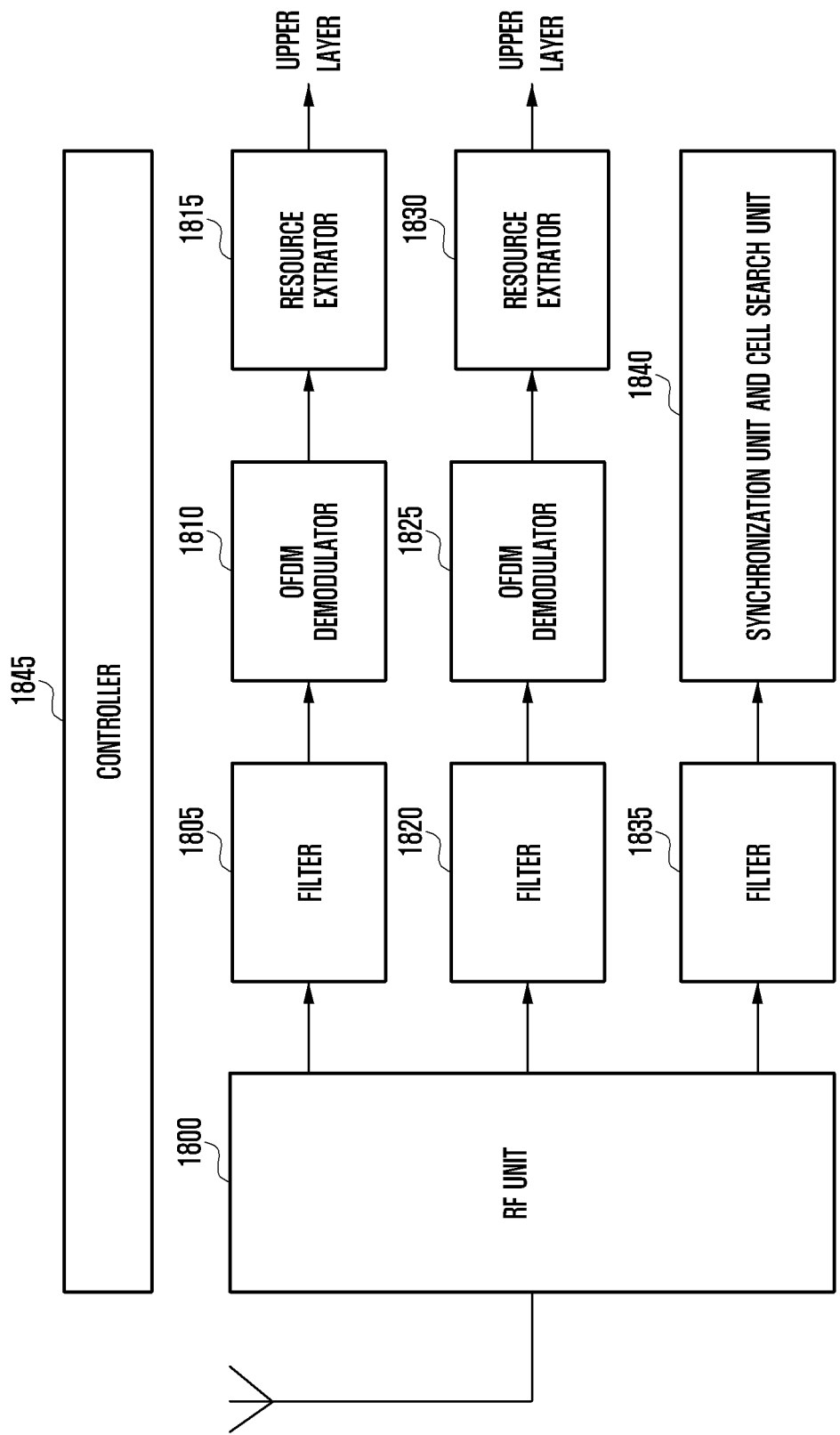
FIG. 18 is a block diagram illustrating an internal structure of a terminal receiver according to an embodiment of the disclosure.

In order to carry out the above-described embodiments of the disclosure, a transmitter of the base station and a receiver of the terminal are shown in FIGS. 17 and 18, respectively. According to the time and frequency synchronization methods and apparatuses proposed in the second and third embodiments, the transmitter of the base station and the receiver of the terminal must operate.

Specifically, FIG. 17 is a block diagram illustrating an internal structure of a base station transmitter according to an embodiment of the disclosure. As shown in FIG. 17, the transmitter of the base station of the disclosure includes resource mappers 1700, 1715, and 1730 for transmitting signals corresponding to respective services, OFDM modulators 1705, 1720 and 1735, and filters 1710, 1725, and 1740. The resource mappers 1700, 1715, and 1730 perform QPSK or QAM modulation on data to be transmitted, and map the data to time and frequency domain resources. The OFDM modulators 1705, 1720, and 1735 perform OFDM modulation on the basis of signals mapped by the resource mappers 1700, 1715, and 1730. Here, OFDM modulation includes performing an inverse fast Fourier transform (IFFT) and inserting a CP before the OFDM symbol. The filters 1710, 1725, and 1740 perform filtering to satisfy the frequency band spectrum mask restriction of the signals generated by the OFDM modulators 1705, 1720, and 1735.

Each service can generate a physical channel and signal through the resource mapper, the OFDM modulator, and the filter allocated to each service. For example, in order to transmit the physical channel and signal for supporting eMBB services, the physical channel and signal for the eMBB may be generated through the resource mapper 1700, the OFDM modulator 1705, and the filter 1710, which are allocated to eMBB transmission. At this time, the resource mapper 1700, the OFDM modulator 1705, and the filter 1710 can generate the physical channel and signal using numerology defined for the eMBB. Similarly to this, common signals may include signals for synchronization and system information acquisition of the terminal, and may generate the physical channel and signal for the common signals through the resource mapper 1730, the OFDM modulator 1735, and the filter 1740, which are allocated for the common signals. At this time, the common signals can be generated using the numerology defined for the common signals. Also, the resource mapper 1730 can freely configure the frequency position where the common signal is transmitted, unlike the existing LTE.

The transmitter of the base station includes a multiplexer 1745 for multiplexing respective filter outputs. Also, the transmitter of the base station includes a controller 1750 for efficiently controlling the resource mappers 1700, 1715 and 1730, the OFDM modulators 1705, 1720 and 1735, the filters 1710, 1725 and 1740, and the multiplexer 1745. Finally, the transmitter of the base station includes an RF unit 1755 and an antenna for transmitting data to respective service terminals which are mutually multiplexed in the multiplexer 1745.

Specifically, FIG. 18 is a block diagram illustrating an internal structure of a terminal receiver according to an embodiment of the disclosure. The receiver of the terminal includes an antenna and RF unit 1800, filters 1805, 1820 and 1835, OFDM demodulators 1810 and 1825, resource extractors 1815 and 1830, a controller 1845, and a synchronization unit and cell search unit 1840. A plurality of filters 1805, 1820 and 1835, OFDM demodulators 1810 and 1825, and resource extractors 1815 and 1830 are required to support services having two or more different numerologies, and FIG. 18 shows an example of supporting two different services.

More specifically, in the receiver of the terminal, the signal received by the terminal is converted into a baseband signal in a passband through the RF unit 1800. The signal converted into the baseband is input to the filters 1805, 1820 and 1835. The filter may be turned on/off according to services that the terminal wants to receive, or the numerology of the filter may be changed. At this time, the filter may be used to eliminate the interference of a signal that has been subjected to FDM in an adjacent frequency region. The synchronization unit and the cell search unit 1840 perform cell searching and synchronization of the terminal according to the second, third, fourth, and fifth embodiments of the disclosure. The OFDM demodulators 1810 and 1825 are used for OFDM demodulation of the filtered signal. The OFDM demodulators 1810 and 1825 may include a CP removal unit and a fast Fourier transform (FFT) unit. The resource extractors 1815 and 1830 extract the physical channel and signal in the resources occupied by the respective services. The controller 1845 may control a series of processes so that the terminal can operate according to the embodiments of the disclosure described above.

Meanwhile, the embodiments of the disclosure disclosed in the present specification and the drawings have been presented to easily explain technical contents of the disclosure and help comprehension of the disclosure, and do not limit the scope of the disclosure That is, it is obvious to those skilled in the art to which the disclosure belongs that different modifications can be achieved based on the technical spirit of the disclosure Further, if necessary, the above respective embodiments may be employed in combination For example, the second, third, and fourth embodiments of the disclosure may be partially combined to operate a base station and a terminal.

The invention claimed is:

1. A method performed by a terminal in a wireless communication system, the method comprising:
receiving, from a base station, channel state information-reference signal (CSI-RS) configuration information for a CSI-RS for tracking;
receiving, from the base station, the CSI-RS for tracking based on the CSI-RS configuration information; and
acquiring at least one of downlink frequency or time synchronization associated with the base station based on the CSI-RS for tracking,
wherein a number of an antenna port for the CSI-RS for tracking is restricted to 1, and
wherein a difference between subcarrier indices of resource elements (REs) for the CSI-RS for tracking is 4 in an orthogonal frequency division multiplexing (OFDM) symbol, and a difference between OFDM symbol indices of the REs for the CSI-RS for tracking is 4.

2. The method of claim 1, wherein the CSI-RS configuration information is received via higher layer signaling, and
wherein the CSI-RS configuration information includes information on a position of the REs for the CSI-RS for tracking and transmission timing information of the CSI-RS for tracking.

3. The method of claim 1, wherein an application of code division multiplexing (CDM) to the CSI-RS for tracking is avoided.

4. The method of claim 1, wherein the REs for the CSI-RS for tracking are placed in a $5^{th}$ OFDM symbol and a $9^{th}$ OFDM symbol in a slot.

5. A method performed by a base station in a wireless communication system, the method comprising:
transmitting, to a terminal, channel state information reference signal (CSI-RS) configuration information for a CSI-RS for tracking; and
transmitting, to the terminal, the CSI-RS for tracking corresponding to the CSI-RS configuration information,
wherein the CSI-RS for tracking is for at least one of downlink frequency or time synchronization associated with the base station,
wherein a number of an antenna port for the CSI-RS for tracking is restricted to 1, and
wherein a difference between subcarrier indices of resource elements (REs) for the CSI-RS for tracking is 4 in an orthogonal frequency division multiplexing (OFDM) symbol, and a difference between OFDM symbol indices of the REs for the CSI-RS for tracking is 4.

6. The method of claim 5, wherein the CSI-RS configuration information is transmitted via higher layer signaling, and
wherein the CSI-RS configuration information includes information on a position of the REs for the CSI-RS for tracking and transmission timing information of the CSI-RS for tracking.

7. The method of claim 5, wherein an application of code division multiplexing (CDM) to the CSI-RS for tracking is avoided.

8. The method of claim 5, wherein the REs for the CSI-RS for tracking are placed in a $5^{th}$ OFDM symbol and a $9^{th}$ OFDM symbol in a slot.

9. A terminal in a wireless communication system, the terminal comprising:
a transceiver; and
a controller coupled with the transceiver and configured to:
receive, from a base station, channel state information reference signal (CSI-RS) configuration information for a CSI-RS for tracking,
receive, from the base station, the CSI-RS for tracking based on the CSI-RS configuration information, and
acquire at least one of downlink frequency or time synchronization associated with the base station based on the CSI-RS for tracking,
wherein a number of an antenna port for the CSI-RS for tracking is restricted to 1, and
wherein a difference between subcarrier indices of resource elements (REs) for the CSI-RS for tracking is 4 in an orthogonal frequency division multiplexing (OFDM) symbol, and a difference between OFDM symbol indices of the REs for the CSI-RS for tracking is 4.

10. The terminal of claim 9, wherein the CSI-RS configuration information is received via higher layer signaling, and
wherein the CSI-RS configuration information includes information on a position of the REs for the CSI-RS for tracking and transmission timing information of the CSI-RS for tracking.

11. The terminal of claim 9, wherein an application of code division multiplexing (CDM) to the CSI-RS for tracking is avoided.

12. The terminal of claim 9, wherein the REs for the CSI-RS for tracking are placed in a $5^{th}$ OFDM symbol and a $9^{th}$ OFDM symbol in a slot.

13. A base station in a wireless communication system, the base station comprising:
a transceiver; and
a controller coupled with the transceiver and configured to control to:
transmit, to a terminal, channel state information reference signal (CSI-RS) configuration information for a CSI-RS for tracking, and
transmit, to the terminal, the CSI-RS for tracking corresponding to the CSI-RS configuration information,
wherein the CSI-RS for tracking is for at least one of downlink frequency or time synchronization associated with the base station,
wherein a number of an antenna port for the CSI-RS for tracking is restricted to 1, and
wherein a difference between subcarrier indices of resource elements (REs) for the CSI-RS for tracking is 4 in an orthogonal frequency division multiplexing (OFDM) symbol, and a difference between OFDM symbol indices of the REs for the CSI-RS for tracking is 4.

14. The base station of claim 13, wherein the CSI-RS configuration information is transmitted via higher layer signaling, and wherein the CSI-RS configuration information includes information on a position of the REs for the CSI-RS for tracking and transmission timing information of the CSI-RS for tracking.

15. The base station of claim 13, wherein an application of code division multiplexing (CDM) to the CSI-RS for tracking is avoided.

16. The base station of claim 13, wherein the REs for the CSI-RS for tracking are placed in a $5^{th}$ OFDM symbol and a $9^{th}$ OFDM symbol in a slot.

* * * * *